(12) United States Patent
Hollis et al.

(10) Patent No.: US 9,671,670 B2
(45) Date of Patent: Jun. 6, 2017

(54) INDUCTANCE-TUNED ELECTRO-OPTIC MODULATORS

(71) Applicants: Mark A. Hollis, Concord, MA (US); Reuel B. Swint, Billerica, MA (US); Dominic Siriani, Boston, MA (US); Joseph P. Donnelly, Carlisle, MA (US); Paul William Juodawlkis, Arlington, MA (US)

(72) Inventors: Mark A. Hollis, Concord, MA (US); Reuel B. Swint, Billerica, MA (US); Dominic Siriani, Boston, MA (US); Joseph P. Donnelly, Carlisle, MA (US); Paul William Juodawlkis, Arlington, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 350 days.

(21) Appl. No.: 14/294,422

(22) Filed: Jun. 3, 2014

(65) Prior Publication Data
US 2016/0202592 A1  Jul. 14, 2016

Related U.S. Application Data

(60) Provisional application No. 61/830,215, filed on Jun. 3, 2013.

(51) Int. Cl.
*G02F 1/035* (2006.01)
*G02F 1/225* (2006.01)
(Continued)

(52) U.S. Cl.
CPC ............. *G02F 1/2255* (2013.01); *G02B 6/14* (2013.01); *G02F 1/01708* (2013.01);
(Continued)

(58) Field of Classification Search
CPC ............ G02B 6/14; G02B 2006/12097; G02F 1/2255
See application file for complete search history.

(56) References Cited

U.S. PATENT DOCUMENTS

| 4,448,479 A | 5/1984 | Alferness |
|---|---|---|
| 5,189,547 A | 2/1993 | Day et al. |

(Continued)

OTHER PUBLICATIONS

Notification of the Transmittal of the International Search Report and the Written Opinion of the International Searching Authority in related PCT Application No. PCT/US14/40655, filed Jun. 3, 2014, mailed Apr. 13, 2015, 18 pages.

(Continued)

*Primary Examiner* — Sung Pak
(74) *Attorney, Agent, or Firm* — Cooley LLP

(57) ABSTRACT

An electro-optic modulator imparts the information contained in an electrical signal traveling along a transmission line onto an optical carrier by using signal-related variations in the electrical signal's voltage to modulate the refractive index or absorption in an electro-optic material through which the optical carrier propagates. For optimal bandwidth and modulation efficiency, the microwave and optical waves should be matched in velocity. However, conventional microwave transmission lines have a microwave velocity that is somewhat higher than the optical group velocity in typical optical waveguides. Tuning a microwave transmission line's capacitance reduces the microwave velocity, but also reduces the impedance below the 50Ω impedance of most microwave components. Conversely, tuning the microwave transmission line's inductance makes it possible to match the microwave velocity to the optical group velocity over bandwidths of 100 GHz or greater while maintaining a microwave impedance of 50Ω.

28 Claims, 15 Drawing Sheets

(51) Int. Cl.
| | |
|---|---|
| *G02B 6/14* | (2006.01) |
| *G02F 1/017* | (2006.01) |
| *G02B 6/12* | (2006.01) |
| *G02F 1/21* | (2006.01) |

(52) U.S. Cl.
CPC ........ *G02F 1/01716* (2013.01); *G02F 1/2257* (2013.01); *G02B 2006/12097* (2013.01); *G02F 2001/212* (2013.01); *G02F 2201/12* (2013.01)

(56) References Cited

U.S. PATENT DOCUMENTS

| | | |
|---|---|---|
| 6,172,791 B1 | 1/2001 | Gill et al. |
| 6,310,700 B1 | 10/2001 | Betts |
| 6,741,762 B2 | 5/2004 | Grinberg et al. |
| 6,763,151 B1 | 7/2004 | Bosso et al. |
| 6,873,750 B2 | 3/2005 | Hum et al. |
| 6,909,817 B2 | 6/2005 | Bosso et al. |
| 6,928,223 B2 | 8/2005 | Walpole et al. |
| 7,256,920 B2 | 8/2007 | Tinoco |
| 8,135,243 B2 | 3/2012 | Marks et al. |
| 2002/0071622 A1 | 6/2002 | Betts et al. |
| 2003/0147574 A1 | 8/2003 | Lam et al. |
| 2006/0067634 A1 | 3/2006 | Bull et al. |
| 2008/0199124 A1 | 8/2008 | Nagatsuma et al. |
| 2010/0019872 A1 | 1/2010 | Bozler et al. |
| 2010/0098424 A1 | 4/2010 | Ho et al. |

OTHER PUBLICATIONS

Bertazzi, F. et al., "A novel coupled physics-based electromagnetic model of semiconductor traveling-wave structures for RF and optoelectronic applications," 11th GaAs Symposium Tech. Digest, Munich, pp. 239-242, (2003).

Bertazzi, F. et al., "Self-Consistent Coupled Carrier Transport Full-Wave EM Analysis of Semiconductor Traveling-Wave Devices," IEEE Trans. Microwave Theory Tech., vol. 54, pp. 1611-1618, Apr. 2006.

Chen, H.-W. et al., "25 Gb/s hybrid silicon switch using a capacitively loaded traveling wave electrode," Optics Express, vol. 18, No. 2, pp. 1070-1075, Jan. 18, 2010.

Chen, H.-W. et al., "Forty Gb/s hybrid silicon Mach-Zehnder modulator with low chirp," Optics Express, vol. 19, No. 2, pp. 1455-1460, Jan. 17, 2011.

Cui, Y et al., "Modeling and Design of GaAs Traveling-Wave Electrooptic Modulators Based on Capacitively Loaded Coplanar Strips," J. Lightwave Tech., vol. 24, pp. 544-554, Jan. 2006.

Dogru, S., "InGaAlAs/InAlAs Multi Quantum Well Substrate Removed Electro-optic Modulators," Proc. IEEE Photonics Conf., Arlington, VA, ThJ2, pp. 739-740, 2011.

Dogru, S. et al., "Ultra-Wide Bandwidth Design for Very-Low Voltage Substrate-Removed Electro-optic Intensity Modulators," Proc. OSA Adv. Phot. Congress, 1M4A.5, (2012).

Dogru, S. et al., "Ultra-Low Voltage Substrate-Removed Mach-Zehnder Intensity Modulators with Integrated Electrical Drivers," Proc. 22nd Annual Meeting IEEE Phot. Soc., Ankara, Turkey, ThG2, pp. 656-657, (2009).

Goldsmith, C. L. et al., "Principles and Performance of Traveling-Wave Photodetector Arrays," IEEE Trans. Microwave Theory Tech., vol. 45, pp. 1342-1350, Aug. 1997.

Juodawlkis, P. W. et al., "High-Power, Low-Noise 1.5-$\mu$m Slab-Coupled Optical Waveguide (SCOW) Emitters: Physics, Devices, and Applications", IEEE Journal of Selected Topics in Quantum Electronics, vol. 17, pp. 1698-1714, Nov.-Dec. 2011.

Juodawlkis, P. W. et al., "InGaAsP/InP quantum-well electrorefractive modulators with sub-volt Vpi", Enabling Photonic Technologies for Aerospace Applications VI, Proc. SPIE, vol. 5435, pp. 53-63, (2004).

Katopodis, V. et al., "Integrated Transmitter for 100 Gb/s OOK Connectivity Based on Polymer Photonics and InP-DHBT Electronics", Optics Express, vol. 27, No. 27, pp. 28538-28543, Dec. 17, 2012.

Klamkin, J. et al., "Uni-traveling-carrier variable confinement waveguide photodiodes," Optics Express, vol. 19, pp. 10199-10205, May 23, 2011.

Macario, J. et al., "Development of Electro-Optic Phase Modulator for 94 GHz Imaging System," Journal of Lightwave Technology, vol. 27, No. 24, pp. 5698-5703, Dec. 15, 2009.

Nagarajan, R. et al., "Effects of Carrier Transport on High-Speed Quantum-Well Lasers", Applied Physics Letters, vol. 59, No. 15, pp. 1835-1837, (1991).

Nuccio, S. R. et al., "Modulation and Chirp Characterization of a 100-GHz EO Polymer Mach-Zehnder Modulator," Proc. OSA/OFC/NFOEC 2011, JThA30, (2011), 3 pages.

Sakamoto, S. R. et al., "Narrow gap coplanar slow wave electrode for travelling wave electro-optic modulators," Electronics Letters, vol. 31, pp. 1183-1185, Jul. 6, 1995.

Shin, J. H. et al.,"35-GHz Bandwidth, 5-V-cm Drive Voltage, Bulk GaAs Substrate Removed Electrooptic Modulators", IEEE Photonics Technology Letters, vol. 19, No. 18, pp. 1362-1364, Sep. 15, 2007.

Spickermann, R. et al., "Experimental Analysis of Millimeter Wave Coplanar Waveguide Slow Wave Structures on GaAs", IEEE Transactions on Microwave Theory and Techniques, vol. 42, No. 10, pp. 1918-1924, Oct. 1994.

Spickermann, R. et al., "Millimetre Wave Coplanar Slow Wave Structure on GaAs Suitable for Use in Electro-Optic Modulators," Electronics Letters, vol. 29, pp. 774-775, Apr. 29, 1993.

Spickermann, R. et al., "GaAs/AlGaAs electro-optic modulator with bandwidth > 40 Ghz," Electronics Letters, vol. 31, pp. 915-916, May 25, 1995.

Weis, R.S. et al., "Lithium Niobate: Summary of Physical Properties and Crystal Structure," Appl. Phys. A 37, pp. 191-203, (1985).

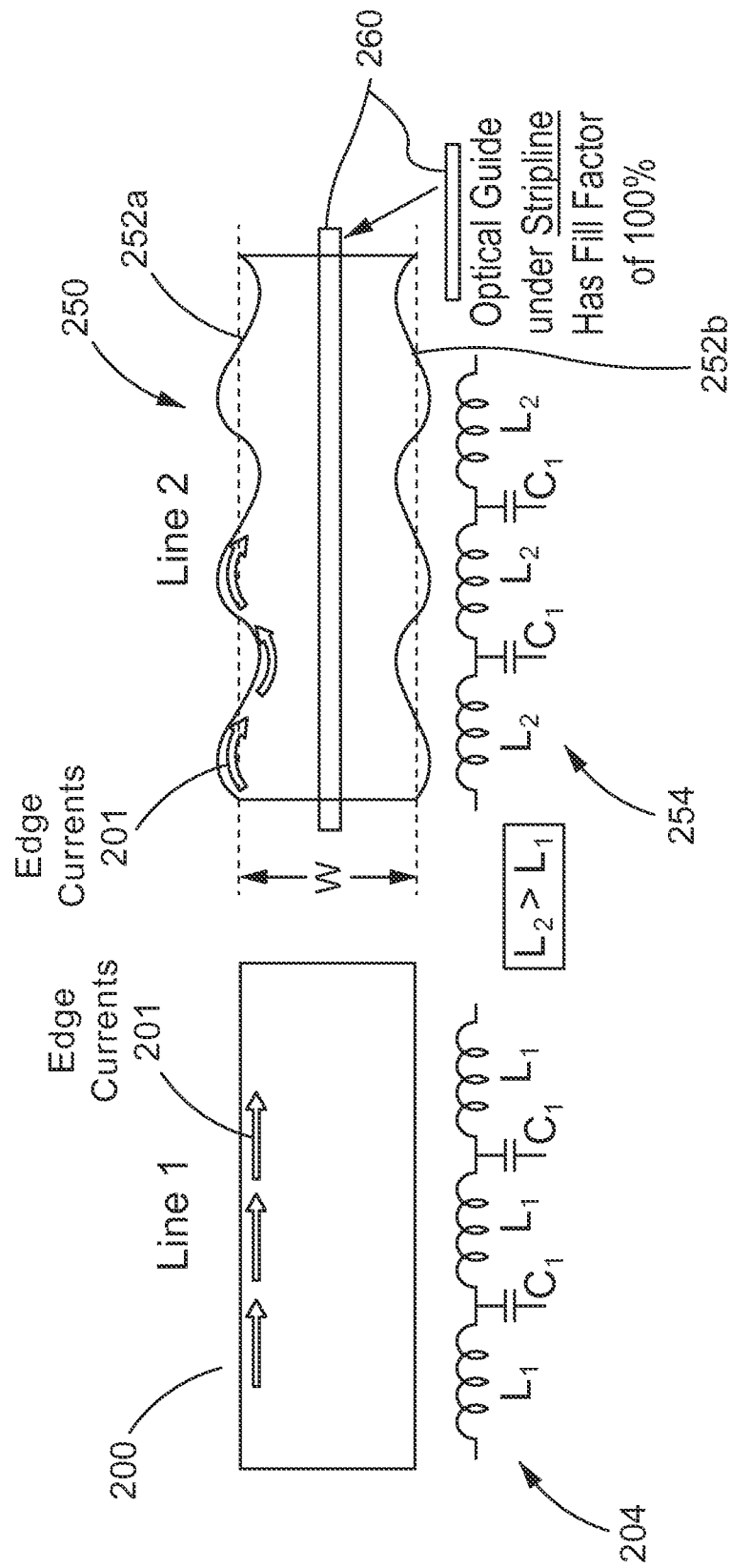

INDUCTANCE-TUNED ELECTRO-OPTIC MODULATORS

CROSS-REFERENCE TO RELATED PATENT APPLICATION

This application claims priority, under 35 U.S.C. §119(e), from U.S. Application No. 61/830,215, filed Jun. 3, 2013, and entitled "INDUCTANCE-TUNED ELECTRO-OPTIC MODULATORS," which application is hereby incorporated herein by reference in its entirety.

GOVERNMENT SUPPORT

This invention was made with government support under Contract No. FA8721-05-C-0002 awarded by the U.S. Air Force. The government has certain rights in the invention.

BACKGROUND

Electro-optic modulators are devices that impress the information in an electrical signal onto an optical carrier. They are used for commercial fiber-optic telecommunications, photonic signal processing, and military electro-optic applications. Commercial modulators used in telecommunications have a typical bandwidth of 25 GHz, which enables data rates of about 100 Gb/s using quadrature phase shift keying (QPSK) or quadrature amplitude modulation (QAM) modulation formats. The highest bandwidth available commercially is 40 GHz. Future-generation telecommunications systems have increasingly higher data-rate requirements (e.g., 200 Gb/s, 300 Gb/s, etc.) that cannot be satisfied by the current state-of-the-art modulators.

There have only been sporadic reports of research modulators that operate at bandwidths above 40 GHz. The Prather group at the University of Delaware has reported a research-grade phase modulator made in $LiNbO_3$ having a 3-dB bandwidth of 94 GHz, but the half-wave drive voltage ($V_\pi$) and optical insertion loss (OIL) are high at 7 V and 3.7 dB, respectively, and this modulator is not available commercially. In addition, $LiNbO_3$ suffers from many deleterious effects including the photorefractive effect, the photovoltaic effect, and charge migration which can dynamically alter the performance of the devices. Gigoptix, Inc. has reported sample quantities of polymer-based modulators having a bandwidth of 70 GHz, a half-wave voltage $V_\pi$ of 6.8 V, and an OIL of 7 dB, but this modulator suffers additionally from a low power-handling capability due to polymer bleaching and lifetime effects (<10 mW estimated). Further, the packaged polymer modulator unit requires a DC bias of 70-180 mA to operate within specifications.

Compound semiconductor modulators made in GaAs- or InP-based materials offer improvements to these parameters but so far the performance demonstrated by developers has fallen far short of the bandwidth requirement of 100 GHz. The most significant body of work in the U.S. on this topic is from the Dagli group at University of California at Santa Barbara, whose best published measurements on a Mach-Zehnder modulator show a bandwidth of 39 GHz, a $V_{pi}$ of 8.4 V (1 mm device length), and an intrinsic OIL excluding input/output coupling losses of 2.9 dB. The optical waveguide structure used in this device was a GaAs core clad by AlGaAs layers, and the device was fabricated using substrate removal and subsequent bonding onto a semi-insulating (S.I.) GaAs carrier wafer. The microwave electrode structure in this device is a coplanar waveguide that is capacitively loaded with periodic T-rails to slow the microwave velocity to match the optical velocity.

Capacitive T-rail loading of the microwave line has been a standard approach for velocity matching in modulator design since the 1980's, but it has a number of drawbacks. First, the fill factor F (ratio of T-rail length to T-rail unit periodicity) is generally undesirably low (e.g., about 0.5) to maintain a characteristic impedance $Z_0$ of 50Ω; raising F to 0.9 or better reduces the impedance to undesirable levels typically between 15Ω and 35Ω. Maintaining the impedance at 50Ω also directly hampers OIL by about 3 dB as the optical waveguide must be made longer by a factor of 1/F. Second, the use of T-rails that are optimized for optical modulation and transmission-line velocity is projected to give an additional 6 dB/cm of microwave loss at 100 GHz over an unloaded transmission line alone, which is unacceptable for many applications. (For perspective, an electrical loss of 0.6 dB/mm would yield an E/O bandwidth of about 100 GHz for a 1-cm-long device.)

InP-based modulators on Si substrates have been demonstrated with bandwidths as high as 27 GHz, $V_{pi}$ values of 4.8 V, and extrinsic OIL values of 4.5 dB for modulator lengths of 500 μm. However, the propagation loss in the microwave electrodes in their later design was measured to be 9 dB at 40 GHz and is projected to be over 16 dB at 100 GHz, which is excessive. Without being bound by any particular theory, this loss may arise from two components: carrier-related loss in the InP quantum wells and doped layers, and loss due to field penetration into the Si substrate.

An electro-optic modulator design with sandwich electrodes containing a high-permittivity material is claimed to be usable at 100 GHz, but there may be some potential issues with the design and more rigorous modeling of the design needs to be done. Another electro-optic modulator design uses integrated active drive employing InP-based HEMTs in a distributed-amplifier arrangement. The possibility of operation up to 15 GHz is shown for this design. Additionally, this design has greater fabrication complexity and requires that three velocities be matched: the gate-line velocity, the drain-line velocity, and the optical velocity.

SUMMARY

The inventors have recognized that further improvements in the bandwidth, drive voltage, and other performance parameters of electro-optic modulators are needed for future high-performance telecommunications, signal-processing, data processing, and military applications. To address these challenges, the inventors have developed the inductance-tuned electro-optic modulators disclosed herein.

One example of an inductance-tuned electro-optic modulator comprises an optical waveguide made at least in part of an electro-optic material and a microwave transmission line in electrical communication with the optical waveguide. In operation, the optical waveguide guides an optical wave propagating at an optical group velocity. Similarly, the microwave transmission line guides an electrical signal propagating at an electrical group velocity so as to electro-optically modulate the optical wave guided by the optical waveguide. The microwave transmission line's inductance may be selected such that (i) the electrical group velocity is substantially equal to the optical group velocity and (ii) the microwave transmission line has an impedance of about 50Ω.

Another example of an inductance-tuned electro-optic modulator includes a Mach-Zehnder interferometer comprising an electro-optic material and first and second strips of conductive material disposed in a first plane parallel to the Mach-Zehnder interferometer. The first and second strips may each have at least one undulating edge that provide an impedance of about 50Ω. The first and second strips may also completely overlap first and second arms, respectively, of the Mach-Zehnder interferometer.

As used herein, the optical group velocity of an optical waveguide is the velocity with which the envelope of a pulse propagates along the optical waveguide. Similarly, the electrical group velocity of a microwave transmission line is the velocity with which the envelope of a pulse propagates along the microwave transmission line. Group velocity can be expressed mathematically as the derivative of the angular frequency ω with respect to the propagation constant β at the center operating frequency $ω_0$: dω/dβ.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A illustrates a conventional microwave stripline with an impedance $Z_1$.

FIG. 2B illustrates a microwave stripline with alternate metal sections shaped so as to raise inductance L, lower capacitance C, and raise the average impedance $Z_{average}$.

DETAILED DESCRIPTION

Electro-optic modulators impart the information contained in an electrical signal onto an optical carrier by using signal-related variations in voltage to modulate the refractive index and/or absorption in an electro-optic material through which the light is passing. A typical electro-optic modulator comprises a microwave transmission line that runs adjacent to an optical waveguide. In operation, electrical signals traveling down the microwave line induce phase and/or attenuation changes in the optical wave as they propagate together.

To improve bandwidth and modulation efficiency, the microwave and optical waves in an electro-optic modulator should be matched in velocity. However, traditional microwave transmission lines have a microwave velocity that is somewhat higher than the optical velocity in an optical waveguide, so the microwave velocity (more specifically, the electrical group velocity) is typically slowed by loading the microwave line with capacitive stubs or T rails. This capacitive loading unfortunately worsens a number of design tradeoffs in the device that end up raising the optical loss, reducing the bandwidth, and/or lowering the microwave impedance below 50Ω, which creates a mismatched impedance condition with the microwave source that provides the electrical signal.

Conversely, tuning the inductance of the microwave transmission line reduces the electrical group velocity with respect to the optical group velocity while increasing the microwave impedance. In some examples, appropriate inductance tuning matches the electrical group velocity to the optical group velocity and sets the microwave impedance to about 50Ω. Inductance tuning can also be used to match the phase velocity of an input RF signal (e.g., a sinusoidal tone) to the phase velocity of the optical signal. An inductance-tuned electro-optic modulator can operate at higher bandwidth (e.g., 100 GHz or more) with lower optical loss than a capacitance-tuned electro-optic modulator while maintaining a microwave impedance of 50Ω.

Inductance-tuned electro-optic modulators can be used in fiber-optic telecommunications systems at data rates of 400 Gb/s or more, depending on the modulation format. They can also be used in digital computation systems, e.g., in optical-fiber- or waveguide-based point-to-point data transfer, whether from blade to blade, core to core, or even now within a single core in advanced architectures. Inductance-tuned electro-optic modulators can be used in photonic signal processing, which includes wideband arbitrary signal generation as well as photonic analog-to-digital converters. Finally, the military has many applications ranging from radar, electronic warfare, and signal-processing applications to specialized telecommunications.

Inductance Tuning Versus Capacitance Tuning

Figure 1B:
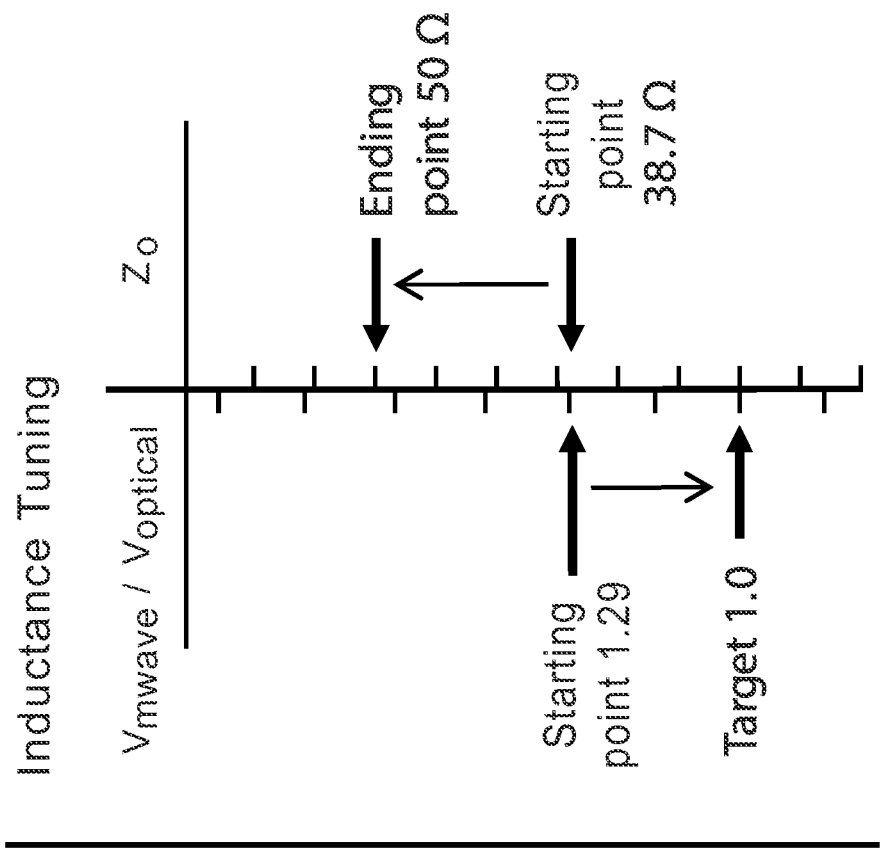
FIGS. 1A and 1B illustrate general principles of capacitance tuning and inductance tuning, respectively, for electro-optic modulators.
Figure 1A:
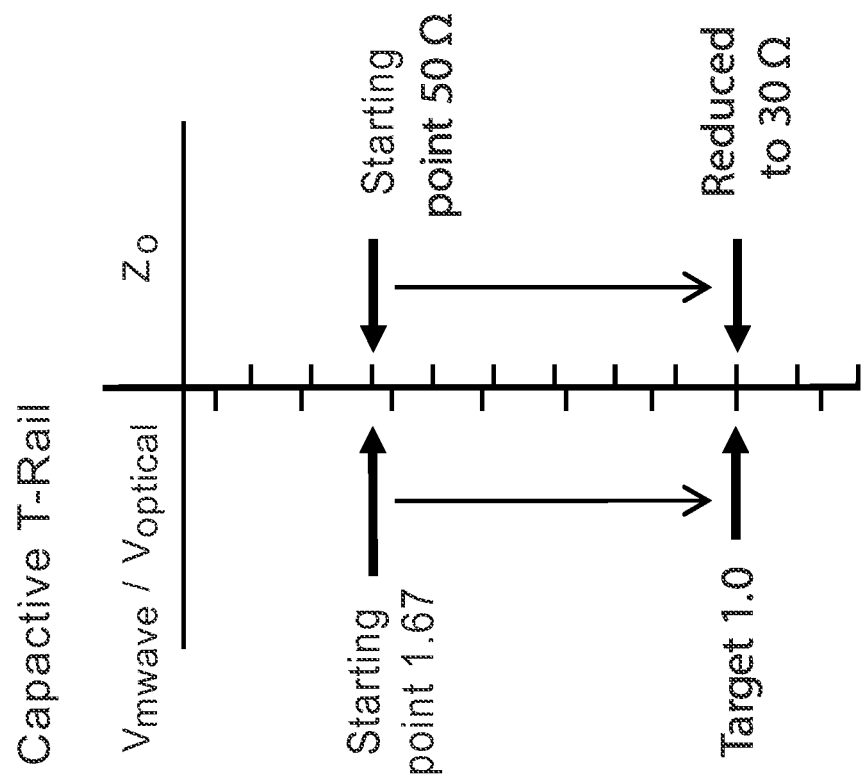

FIGS. 1A and 1B illustrate differences between capacitance tuning (FIG. 1A) and inductance tuning (FIG. 1B) for electro-optic modulators. As understood in the art of electro-optic modulators, the microwave velocity (electrical group velocity) in a microwave stripline or other electrode is given by $v_{micro}=(LC)^{-1/2}$, where L and C are the inductance and capacitance per unit length, respectively, of the electrode. The microwave impedance $Z_0$ also depends on the electrode's inductance and capacitance per unit length: $Z_0=(L/C)^{1/2}$.

As shown in FIG. 1A, conventional modulator design involves capacitive tuning (e.g., via T rails). Since capacitance appears in the denominator of both the microwave velocity and the impedance, increasing the capacitance causes decreases in both the microwave velocity and the impedance, which generally prevents the simultaneous achievement of electrical/optical velocity matching and an impedance $Z_0=50Ω$. Put differently, merely raising the electrode's capacitance may reduce the microwave velocity so that it matches the optical velocity, but it also has the deleterious effect of reducing the impedance $Z_0$ to between 15Ω and 35Ω.

In contrast, FIG. 1B shows that tuning the electrode's inductance offers more flexibility. Provided that the electrode's starting structure has an initial impedance $Z_0$ below 50Ω and a microwave velocity above the optical group velocity (which is usually the case), inductance tuning can match the velocities while making $Z_0$ equal or very close to a desired impedance value. For instance, the inductance may be tuned to 50 Ω, 75 Ω, 100Ω, etc., or any other desired impedance value. Moreover, the tuning of the inductance can be decoupled (or at least somewhat decoupled) from the respective change in capacitance, providing more degrees of freedom. The capacitance may also be manipulated to achieve both velocity matching and $Z_0=50Ω$ as described below.

Inductance-Tuned Microwave Transmission Lines

FIGS. 2A and 2B show an untuned microwave stripline 200 and an inductance-tuned microwave stripline 250, respectively. (Each figure shows only a single stripline for simplicity; those of skill in the art will appreciate that an electro-optic modulator would include at least one other conductor to guide the propagating current.) Both striplines 200, 250 comprise a layer of conductive material, such as silver or gold, that is patterned to guide an electrical signal (here, the electrical signals propagate from left to right). The untuned microwave stripline 200 a straight stripline having $Z_0=40Ω$. It has a microwave velocity that is up to 25% higher than the optical group velocity.

The untuned microwave stripline 200 can be tuned by shaping or patterning periodic sections of conductive material (e.g., metal) to make narrower segments having higher inductance. This raises the impedance since inductance has been increased, on average, along the line. (The capacitances of the straight stripline 200 and the inductance-tuned stripline 250 are roughly the same, as the metal areas are the same.) Without being bound by any particular theory, the stripline 250 shown FIG. 2B may have lower inductance because the microwave currents flow mostly in the edges of the stripline 250. Adding sine-like undulations along the stripline's edges increases the path lengths for the currents which slows the velocity of propagation. This is electrically equivalent to adding more inductance, as it has the same effect on velocity, and inductance can be expressed as the product of a time delay and a resistance (more path length).

The inductance-tuned microwave stripline 250 in FIG. 2B has the same average width W and the same capacitance/unit length as the straight microwave stripline 200, but it has a greater inductance as represented in the network diagrams 204 and 254, respectively. Because its inductance is higher, the inductance-tuned microwave stripline 250 has a microwave velocity that matches the optical group velocity within an optical waveguide 260 that runs underneath it. It also has an impedance $Z_0$ of 50Ω and a fill factor F=1.0, which enables a shorter optical waveguide 260 and hence lower attenuation due to absorption and scattering within the optical waveguide 260. This propagation loss is sometimes referred to as optical insertion loss (OIL), possibly because the light is being inserted into one end of the optical waveguide 260 and emitted at the other end of the optical waveguide 260 at a reduced amplitude.

Without being bound by any particular theory, inductance is a function of the stripline's tapers and widths and does not vary by the same factor as the capacitance, thereby offering freedom to achieve all design objectives. In the example shown in FIG. 2B, the inductance-tuned microwave stripline's increased inductance may arise from its curved edges 252a and 252b (collectively, curved edges 252), which provide a longer path for edge currents 201. As shown in FIG. 2B, the curved edges 252 follow the shape of a series of smooth curves, or undulations. For example, the curved edges 252 may be sinusoidal, sine-like, or in the shape of one or more Bézier curves. The inside edge, outside edge, or both edges may be curved. Without being bound by any particular theory, curved edges may provide lower loss than structures with sharp inside or outside corners. The curved edges 252 should have periods that are much less than a quarter of the microwave wavelength to avoid reflection and Bragg effects, which is relatively easy to accomplish even at frequencies of 100 GHz.

Figure 2C:
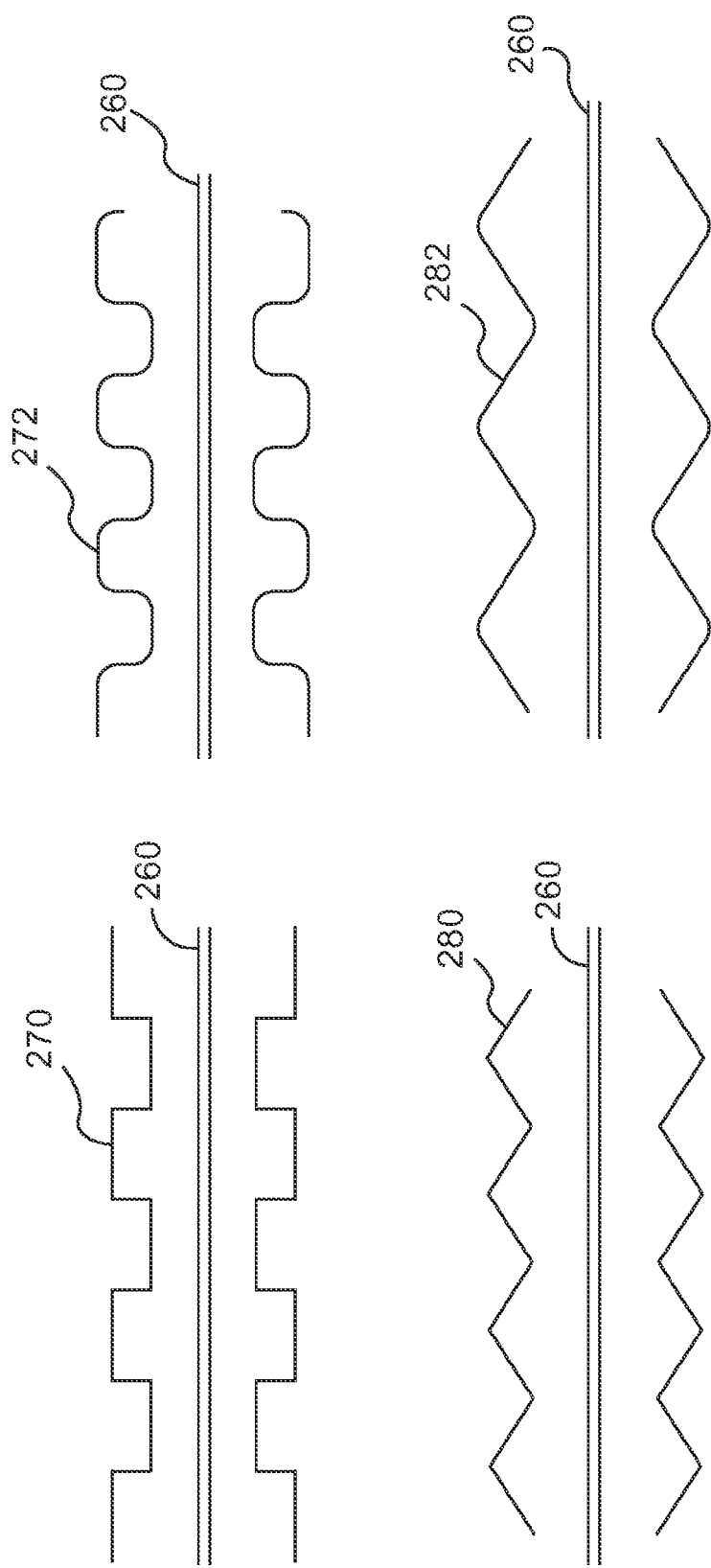
FIG. 2C illustrates inductance-tuned microwave striplines with different edge shapes.

FIG. 2C illustrates inductance-tuned microwave transmission lines with other shapes, including: a microwave transmission line 270 with square-wave edges (rectangular notches), a microwave transmission line 272 with rounded square-wave edges (rounded rectangular notches), a microwave transmission line 280 with sawtooth edges (triangular notches), and a microwave transmission line 282 with rounded sawtooth edges (rounded triangular notches). Other shapes and edge combinations are also possible. Without being bound by any particular theory, it appears that filling the inside corners of notches cut into a straight stripline reduces current crowding and excess skin losses. Smoothing the edges of the resulting stripline lowers skin losses further in the edges and offers more quasi-independent ranges of adjustment for the inductance and capacitance, as the inductance is a function of the stripline's tapers and widths, whereas the capacitance is mostly given by the area of the metal.

A potential drawback to inductance tuning is increased microwave skin loss in the transmission lines, but this loss can be mitigated by using an electrode material with higher conductivity, such as silver (Ag), gold (Au), and copper (Cu). Silver is about 1.4 times more conductive than gold. Microwave skin loss can also be reduced by selecting a loss-minimizing design like those shown in FIGS. 2B, 3A, and 3B. Depending on the design, use of Ag allows up to about 40% more inductance to be added before the loss reaches that of an Au line without additional inductance.

As noted above, FIG. 2B also shows that the inductance-tuned microwave stripline 250 has a fill factor of 100%. That is, the inductance-tuned microwave stripline 250 completely covers the optical waveguide 260, which guides an optical signal in the same direction as the electrical signal. As readily appreciated by those of skill in the art of electro-optic modulators, a higher fill factor increases the modulation efficiency because a larger proportion of the electric field interacts with the electro-optic material in or on the optical waveguide 360. Because the modulation efficiency is higher, the optical waveguide can be shorter, which often leads to lower optical losses.

Conversely, the T-rails in capacitively tuned electro-optic modulators have fill factors of less than 100% and therefore tend to be less efficient. T-rail capacitive loading can provide non-ideal combinations of impedance, fill factor, and OIL, including: an impedance $Z_0$ of 50Ω with a fill factor of about 0.5 and OIL degraded by about 3 dB; or an impedance $Z_0$ of 30Ω with fill factor F of about 0.9 and OIL degraded by about 10%. TABLE 1 summarizes differences between inductance tuning and capacitive tuning:

TABLE 1

| | Inductance Tuning | | | |
| --- | --- | --- | --- | --- |
| Approach | Impedance $Z_0$ | Fill Factor F | Optical Waveguide Length | Optical Insertion Loss (OIL) Degradation |
| Inductance Tuning | 50 Ω | 1.0 | 1X | None |
| T-rail Capacitive Loading (Case 1) | 30 Ω | 0.9 | 1.1X | −1.05 dB |
| T-rail Capacitive Loading (Case 2) | 50 Ω | 0.5 | 2X | −3 dB |

Inductance-Tuned Mach-Zehnder Modulators

FIGS. 3A-3D show an inductance-tuned Mach-Zehnder modulator 300 that can operate at microwave bandwidths of 100 GHz (and higher) and at optical power levels of 100 mW (and higher). The modulator 300 includes a substrate 322 that supports an optical waveguide 320 comprising at least one electro-optic material, including but not limited to $LiNbO_3$, $BaTiO_3$, GaAs, AlGaAs, InP, InAs, InAsP, InGaAsP, other III-V semiconductors, electro-optic polymer, or any other suitable material. In some cases, the optical waveguide 320 comprises an electro-optic material and/or has a structure that supports an optical group velocity at the operating wavelength that is slower than the electrical group velocity in an untuned transmission line. The microwave transmission line(s) may also be inductance-tuned after fabrication or assembly (e.g., using laser ablation, other etching techniques, or using laser direct writing of additional conductive material) in order to adjust the microwave velocity up or down. For instance, one can lower the velocity by cutting the valleys in the undulation(s) deeper and raise the velocity by trimming off the peaks. Fine tuning of the inductance can even be done in quasi-real time as the device is being measured.

The optical waveguide 320 branches into a pair of arms 326a and 326b (collectively, arms 326) in a Mach-Zehnder interferometer. An optical mode converter 330, whose cross section appears in the inset of FIG. 3B, connects the optical waveguide 320 to a single-mode optical fiber 324 that guides light from a laser, such as a distributed feedback (DFB) laser or distributed Bragg reflector (DBR) laser. The optical mode converter 330 is described in greater detail below with respect to FIG. 7.

Figure 3A:
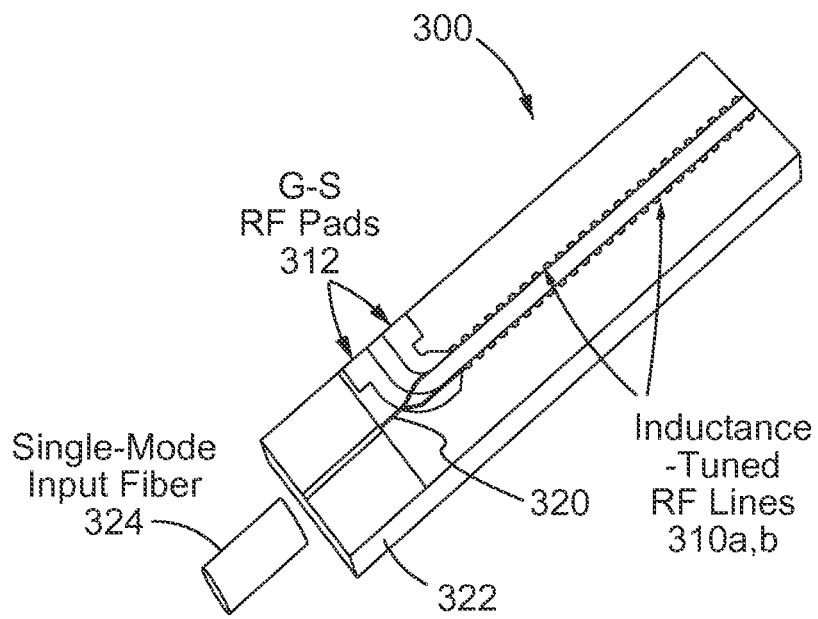
FIG. 3A is a top view of the input section of an inductance-tuned AlGaAs-based electro-optic modulator (first 1.5 mm of device shown).
Figure 3B:
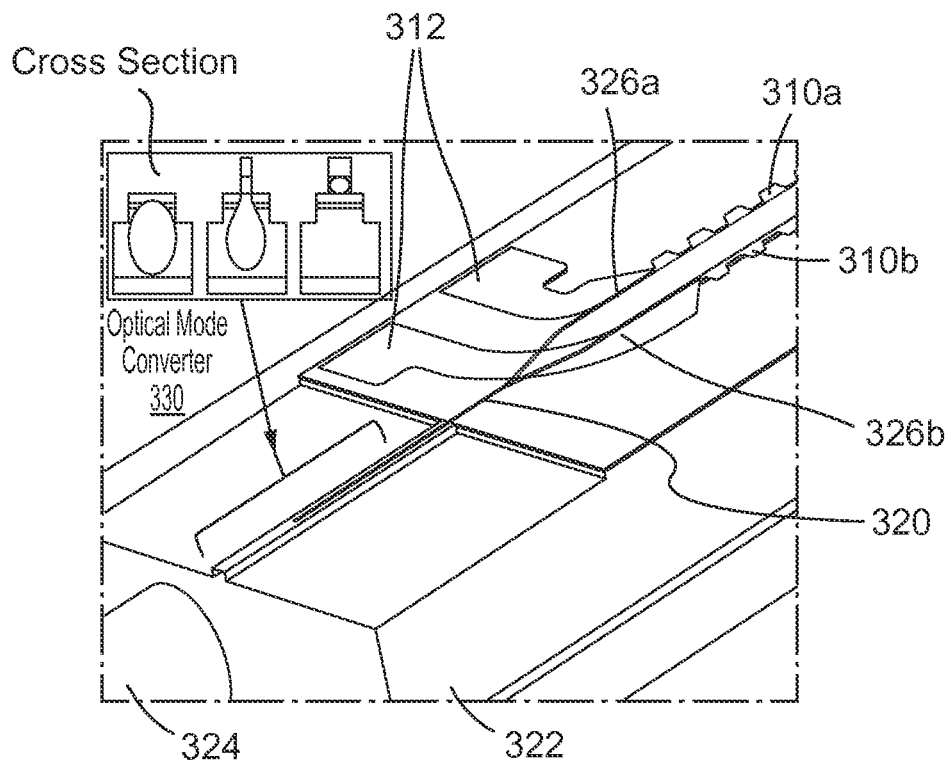
FIG. 3B shows close-up of an optical mode converter that is used to transform the large input mode from the optical fiber into a smaller waveguide mode for the active sections of the inductance-tuned electro-optic modulator shown in FIG. 3A.

The modulator 300 also includes a pair of inductance-tuned traveling-wave electrodes, shown in FIGS. 3A-3D as microwave striplines 310a and 310b (collectively, striplines 310) disposed over the interferometer arms 326a and 326b, respectively. These coplanar striplines (CPS) 310 are amenable to fabrication and integration with the optical waveguides 326 in a dual-arm Mach-Zehnder modulator. As shown in FIGS. 3A and 3B, the striplines 310 have undulating edges whose shapes are selected so as to match the optical and electrical group velocities while maintaining an impedance of 50Ω. The striplines 310 also have fill factors of 100%, which reduces the lengths of the waveguide arms 326. Each stripline 310 terminates in a respective radio-frequency (RF) pad 312a, 312b (collectively, RF pads 312).

Figure 3C:
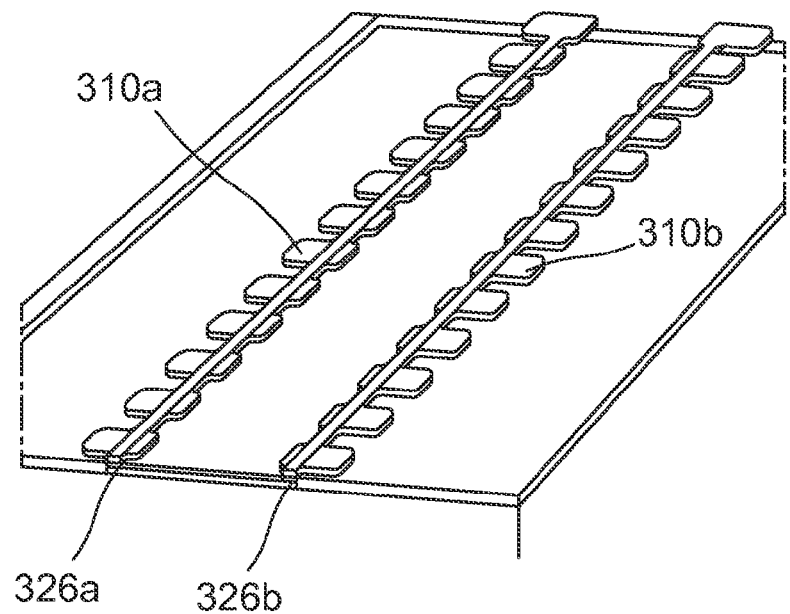
FIGS. 3C and 3D show additional views of the microwave striplines in the inductance-tuned electro-optic modulator shown in FIG. 3A.
Figure 3D:
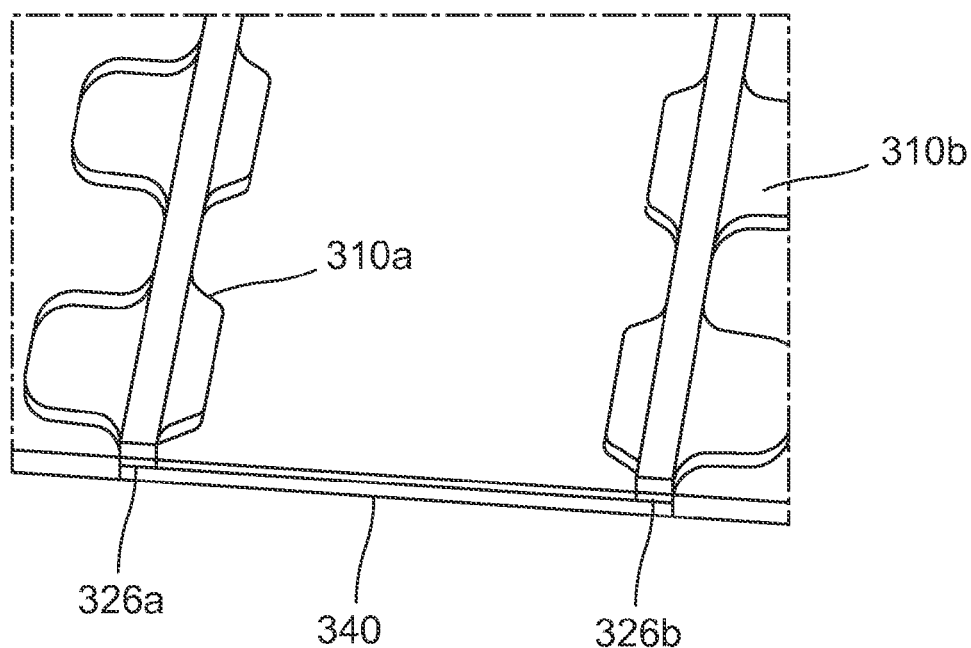

As shown in FIGS. 3C and 3D, this electrode geometry is a hybrid between microstrip (stripline to lower bridge metal) and coplanar stripline (stripline to stripline) over the interferometer arms 326 (active regions of the modulator). Outside the optically active regions, the microwave electrodes behave as simple coplanar striplines and are fed using commercial ground-signal (G-S) probes. To reduce reflections and impedance mismatches, the line dimensions are tapered to maintain an impedance of 50Ω as the lines transition from the passive regions into and out of the active areas.

To ensure utility for broadband signals (e.g., electrical signals with bandwidths of up to 100 GHz or more), the transmission lines 310 have very low microwave dispersion. (Suspended striplines also show little to no dispersion at 100 GHz.) Additionally, since reducing microwave loss increases the achievable microwave bandwidth (e.g., to 100 GHz or higher), the striplines 310 may be formed of materials with relatively high conductivity, such as silver (Ag). Carrier-related microwave losses in the optical waveguide are further reduced by keeping the doping of the cladding layers (not labeled) in the interferometer arms 326 to $5 \times 10^{16}$ $cm^{-3}$ or below. The interferometer arms 326 may also be lightly doped or undoped to reduce microwave loss.

In operation, the single-mode fiber 324 launches a beam of light (e.g., at a wavelength of 1.06 μm, 1.55 μm, or any other suitable wavelength) into the optical mode converter 330, which couples the mode into the optical waveguide 320. The beam propagates along a path defined by the optical waveguide 320, before splitting into portions of equal amplitude that propagate along paths defined by the interferometer arms 326. Similarly, the RF pads 312 couple electrical signals from a microwave signal source (not shown) into the microwave striplines 310. Because the microwave striplines 310 have an impedance of about 50Ω, which matches the impedance of most microwave signal sources, the interface between the microwave signal source and the electro-optic modulator 300 transmits the electrical signals rather than reflecting or attenuating them.

As the electrical signals propagate via the striplines 310, they induce changes in the refractive index (or absorption) of the interferometer arms 326, which in turn affect the phases of the optical waves guided by the interferometer arms 326. For a "push-pull" electro-optic modulator, the phase changes may be equal in magnitude and opposite in sign, e.g., a phase change of $+\pi/4$ in one arm and a phase change of $-\pi/4$ in the other arm. Because the microwave velocity in the striplines 310 matches the optical group velocity in the interferometer arms 326, the optical signals more effectively undergo the phase shifts induced by the electrical signal. And because the fill factor is 1.0, the electrical field modulates the refractive indices along the complete lengths and widths of the interferometer arms 326, which reduces the optical path length through the interferometer arms 326 required to impart a given phase change. This reduction in optical path length makes it possible to use shorter waveguides with lower overall optical insertion loss and attenuation.

Figure 4A:
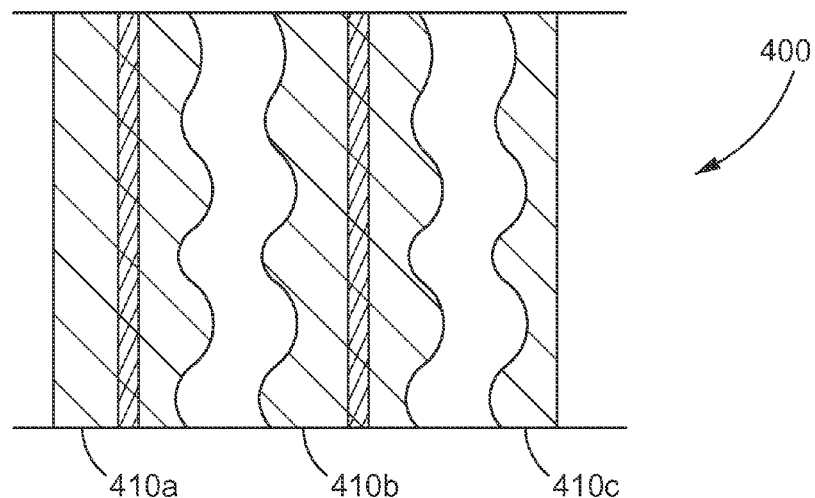
FIGS. 4A and 4B show plan and profile views, respectively, of an inductance-tuned electro-optic modulator with coplanar waveguide electrodes.
Figure 4B:
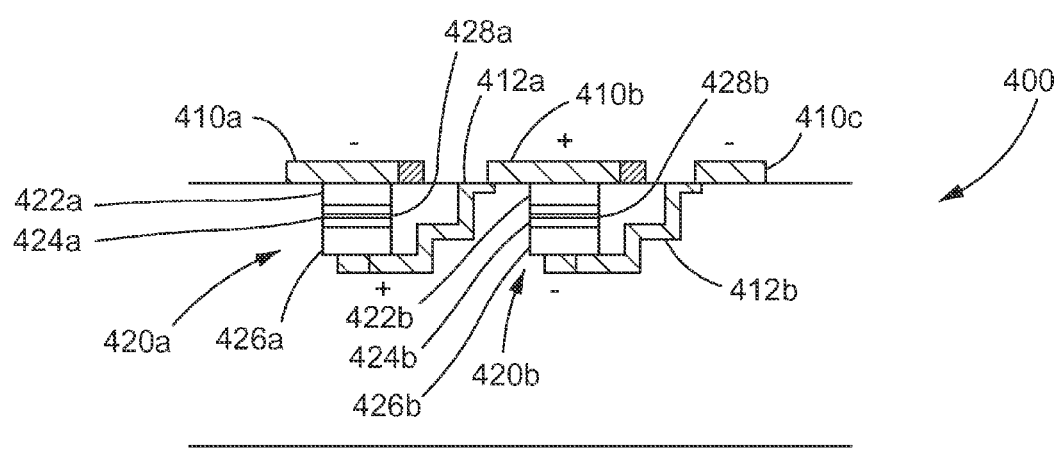

FIGS. 4A and 4B show part of an inductance-tuned electro-optic modulator 400 that comprises coplanar waveguide electrodes 410a-410c (collectively, coplanar waveguide electrodes 410) disposed above a pair of optical waveguides 420a and 420b (collectively, optical waveguides 420). Each optical waveguide 420a/420b includes a respective upper cladding layer 422a/422b, a respective core layer 424a/424b, a respective lower cladding layer 426a/426b, and a respective quantum well layer 428a/428b disposed within the core layer 424a/424b. The quantum well layers 428a and 428b may increase the electro-optic modulator's modulation efficiency. One or more of these layers includes an electro-optic material, such as GaAs or AlGaAs, whose refractive index and/or optical absorption changes as a function of the applied electric field amplitude.

The coplanar waveguide electrodes 410 comprise conductive material, such as silver, that is patterned, e.g., with undulating edges, to tune the inductance so as to provide an impedance of 50Ω and/or to match the electrical group velocity to the optical group velocity. For example, one or both of the inner edges of the outer, or ground, coplanar waveguide electrodes 410a and 410c can be patterned, and one or both edges of the middle, or signal, coplanar waveguide electrode 410b can be patterned (as shown in FIG. 4), etc.

As shown in FIG. 4B, the electro-optic modulator 400 is a push-pull device, with a first electrical contact 412a that runs from underneath the first optical waveguide 420a to the signal coplanar waveguide electrode 410b and a second electrical contact 412b that runs from underneath the second optical waveguide 420b to the ground coplanar waveguide electrode 410c. As readily understood in the art, applying an electrical signal to the signal coplanar waveguide electrode 410b produces oppositely directed electric fields across the optical waveguides 420.

Figure 4C:
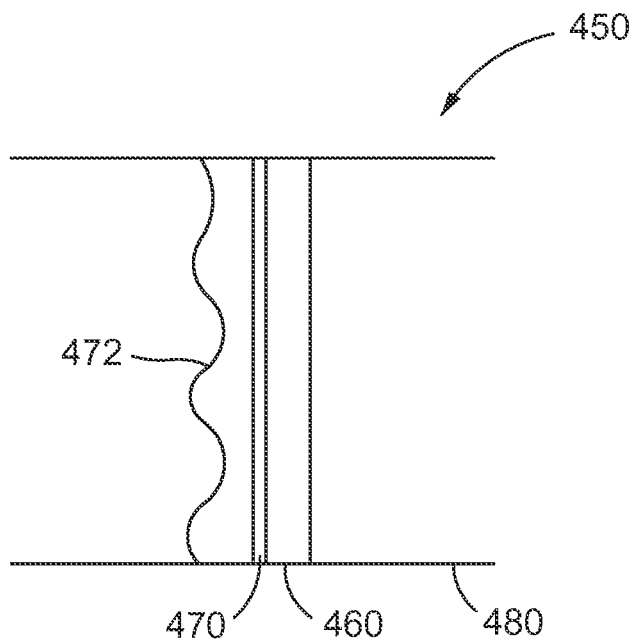
FIGS. 4C and 4D show plan and profile views, respectively, of an inductance-tuned electro-optic modulator with a microstrip electrode for electro-absorption modulation or phase modulation.
Figure 4D:
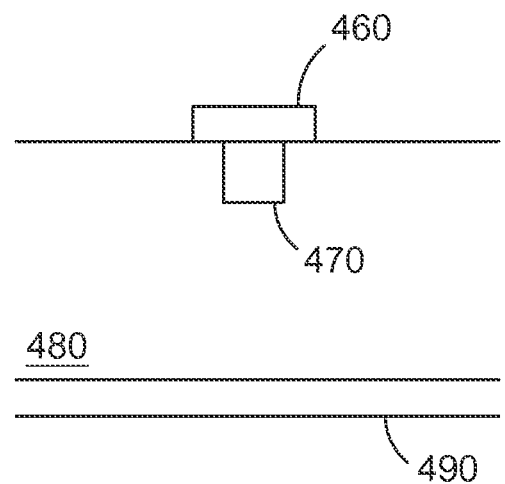

FIGS. 4C and 4D show an inductance-tuned electro-optic modulator 450 that comprises an inductance-tuned stripline 460 disposed completely over an optical waveguide 470 in a substrate 480. The optical waveguide 470, the substrate 480, or both may include electro-optic material, such as electro-optic polymer or III-V semiconductor material. The electro-optic modulator 450 also includes a layer of conductive material 490, such as silver, gold, or copper, disposed opposite the optical waveguide 470 from the stripline 460. As shown in FIG. 4C, the stripline 460 has a sine-like undulating edge 472 to increase its inductance. Although the stripline 460 shown in FIG. 4C has only one undulating edge 472, other striplines may have two undulating edges, undulating edge(s) with different shapes (e.g., the shapes shown in FIG. 2C), etc. The exact dimensions and shape of the stripline's edges can be selected based on the desired microwave velocity, the desired impedance, or both. As readily understood in the art, applying an electrical signal to the stripline 460 produces an electric field across the optical waveguide 470. The electro-optic material in or near the optical waveguide 470 responds to the electric field by changing its refractive index (absorption), which produces a corresponding modulation of the phase (amplitude) of the optical signal propagating through the optical waveguide 470.

Optical Waveguide Design

As mentioned above, the optical waveguides in an electro-optic modulator may include optical ridge waveguides that guide optical modes with relatively small diameters. As readily understood by those of skill in the art, reducing the cross section of the optical mode can lead to a reduced half-wave voltage $V_\pi$, which in turn reduces the modulator's power consumption. For instance, using a tightly confined, undoped optical waveguide core may lead to a half-wave voltage of about 1 V or less with relatively low OIL.

Figure 5A:
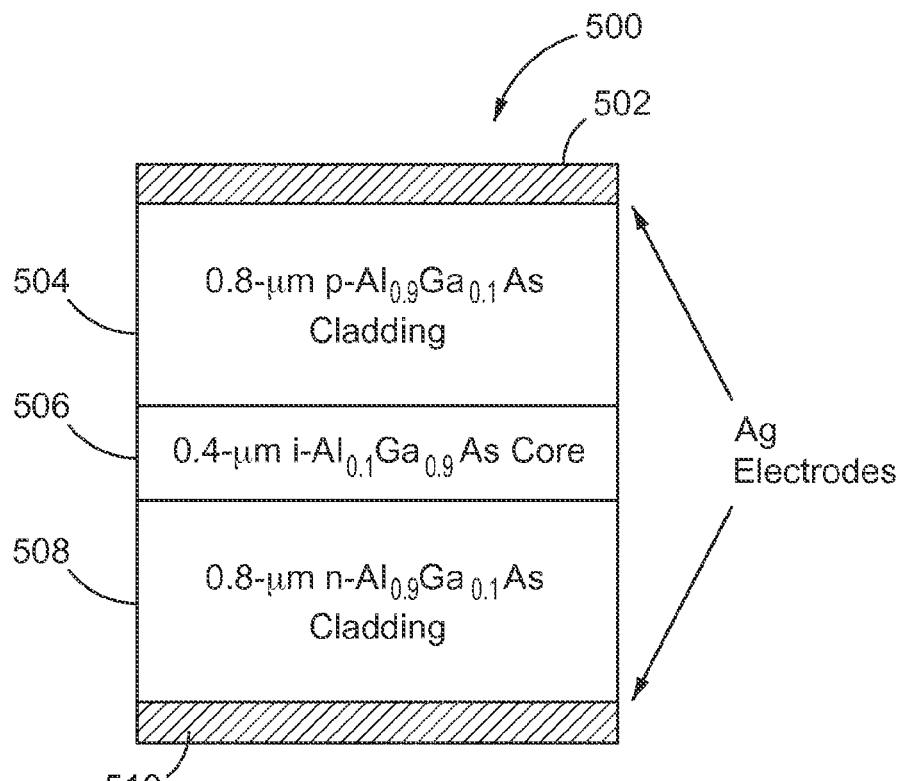
FIG. 5A shows the cross section of an optical waveguide suitable for use in an inductance-tuned electro-optic modulator.

FIG. 5A shows the cross section of an optical waveguide 500 suitable for use in an inductance-tuned electro-optic modulator. The optical waveguide 500 is grown as a p-i-n structure (p-AlGaAs cladding, i-core, n-AlGaAs cladding) to reduce leakage current under bias. It includes a first silver Schottky electrode or Ohmic contact 502, which may be patterned to have one or more undulating edges, disposed on an upper cladding 504 formed of p-doped $Al_{0.9}Ga_{0.1}As$ with a thickness of about 0.8 nm. The upper cladding 504 is disposed on a waveguide core 506, which is formed of intrinsic $Al_{0.1}Ga_{0.9}As$ with a thickness of about 0.4 nm. The fraction of aluminum in the waveguide core 506 may be set (e.g., to between about 10% to about 15%) to reduce or eliminate two-photon absorption at a wavelength of 1550 nm; this increases the amount of optical power that can be transmitted through the waveguide 500 (e.g., to levels of over 100 mW). The waveguide core 506 is disposed on a lower cladding layer 508, which is formed of n-doped $Al_{0.9}Ga_{0.1}As$ with a thickness of about 0.8 μm and disposed on another silver Schottky electrode or Ohmic contact 510.

For applications where very high linearity is beneficial, the doping of the cladding layers should be chosen to minimize variations in device capacitance (depletion widths) with variations in voltage. This typically would mean using undoped or very low doped cladding layers, or possibly very highly doped cladding layers provided the carriers do not cause excess microwave or optical losses. Alternatively, Schottky-barrier contacts can be used on either the top or bottom of the waveguide (or both) rather than the p-doped and n-doped cladding layers shown in FIG. 5A. Note also that DC voltage bias can be applied between any of the Ag conductors in the modulator designs to set the operating points for the diode waveguides to an optimal level of reverse bias. In this case the microwave signals appear in push-pull mode across the diodes about this operating point.

Applying an electric field to the waveguide core 506 causes the waveguide core's refractive index to change via the linear electro-optic effect (LEO). The modulation strength per unit length for the LEO is not quite as strong as the LEO combined with the quadratic electro-optic effect and other quantum-well effects, but provides a modulator design that operates with relatively low microwave losses. In addition, since the electrode geometries above enable a fill factor F=1.0, the modulator length (and hence the optical loss) is essentially no greater than existing modulators where the fill factor F=0.5-0.9.

Figure 5B:
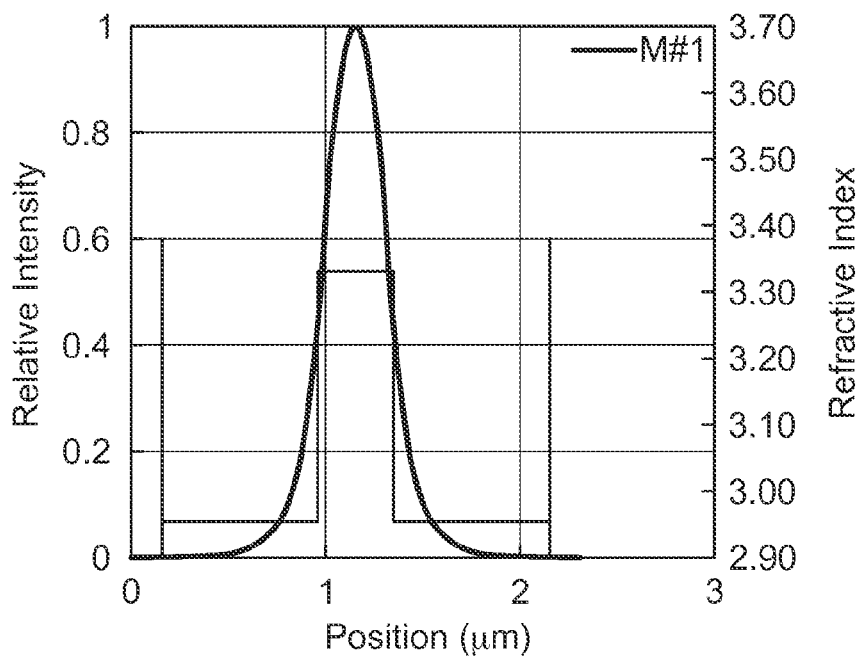
FIG. 5B is a plot of the calculated mode confinement at 1.55 μm in the optical waveguide of FIG. 5A.

FIG. 5B is a plot of the mode profile (left axis) and waveguide refractive index (right axis) versus vertical position for the optical waveguide 500 of FIG. 5A. It shows that the mode is very tightly confined in the waveguide core region. The modal loss for a cladding thickness of 0.8 µm is only −0.2 cm$^{-1}$ which enables a very low intrinsic OIL value of 0.09 dB/mm for an optical wavelength of 1.55 µm. This calculation assumes that the cladding layers are doped at $5 \times 10^{16}$ cm$^{-3}$ and are bounded by Au or Ag electrodes on both sides. The calculated half-wave voltage for this structure is a low 1.16 V assuming the same doping for the cladding, an Al fraction of 10% for the undoped core, and a modulated length of 10 mm.

Figure 6A:
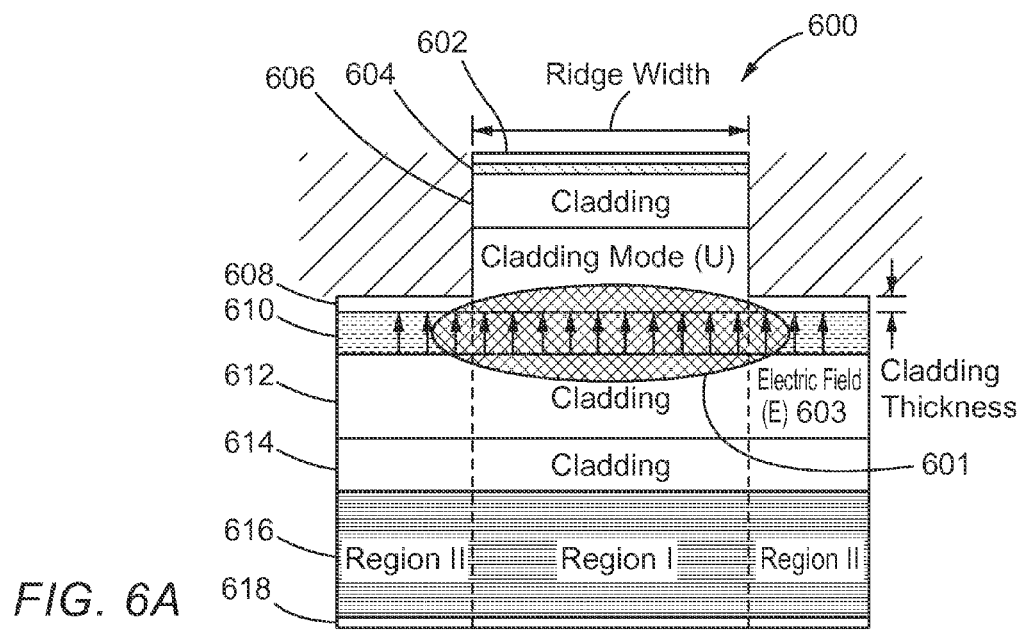
FIG. 6A shows the cross section of an optical ridge waveguide suitable for use in an inductance-tuned electro-optic modulator.

FIG. 6A shows an optical ridge waveguide 600 suitable for use in an inductance-tuned electro-optic modulator. The optical ridge waveguide 600 includes a cap layer 602, which may comprise GaAs doped with Zinc at a doping concentration of about $10^{19}$ cm$^{-3}$ and a thickness of 0.1 µm. The cap layer 602 acts as an Ohmic contact and prevents oxidation. It may be disposed on a graded layer 604, also p-doped (e.g., with Zinc), whose composition varies from 10% to 90% AlGaAs over a thickness of about 0.2 µm. The graded layer 604 may be disposed on a p-doped upper cladding layer 606 that in turn is disposed on an upper cladding layer 608 with a lower doping level. Together, the cap layer 602, graded layer 604, cladding layer 606, and cladding layer 608 are patterned to form a ridge with a ridge width and a cladding thickness that affect the number of modes guided by the optical ridge waveguide 600.

The optical ridge waveguide 600 also includes a GaAs core 610 disposed above a lightly n-doped lower cladding layer 612, which is disposed on another, more heavily n-doped cladding layer 614. Underneath the cladding layer 614 is another layer 616 that may include an additional AlGaAs composition grading and a buffer on a GaAs substrate 618. In operation, an electric field 603 modulates the refractive index of the optical core 610 guiding the mode 601.

Figure 6B:
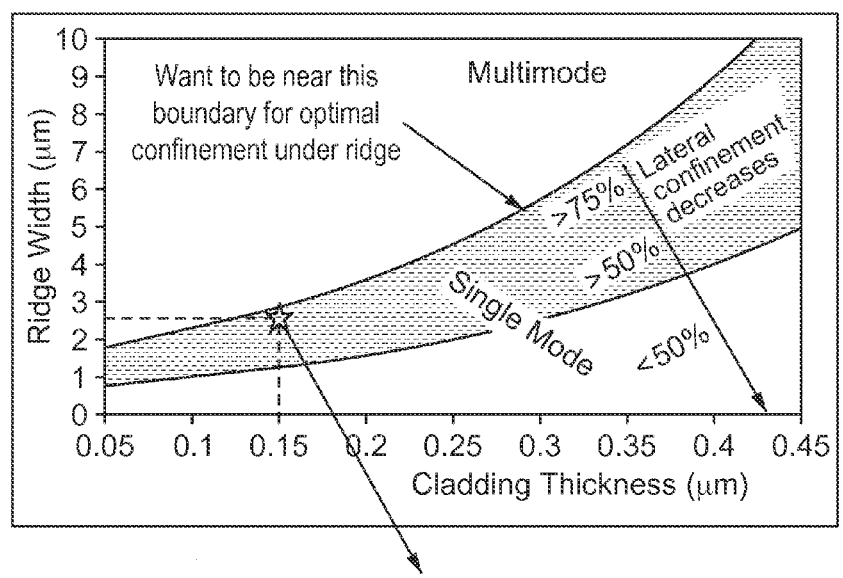
FIG. 6B is a plot of mode confinement as a function of cladding thickness and ridge width for the optical ridge waveguide of FIG. 6A.
Figure 6C:
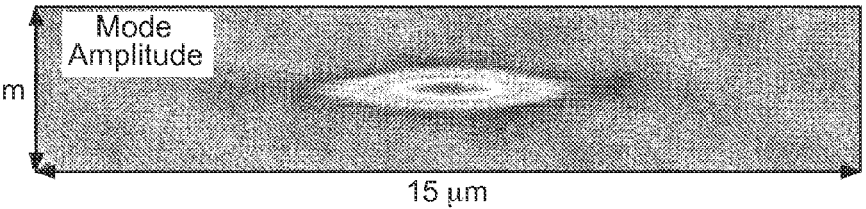
FIG. 6C is a plot of the calculated mode confinement at 1.55 μm in the optical waveguide of FIG. 6A.

FIGS. 6B and 6C illustrate the simulated performance of the optical ridge waveguide 600 of FIG. 6A. More specifically, FIG. 6B shows the number of guided modes as a function of ridge width (vertical axis) and cladding thickness (horizontal axis) as illustrated in FIG. 6A. Increasing the cladding thickness and the ridge width decreases the lateral confinement, leading to multimode operation. And FIG. 6C is a plot of the mode amplitude for a cladding thickness of about 0.15 µm and a ridge width of about 2.6 µm.

Figure 7:
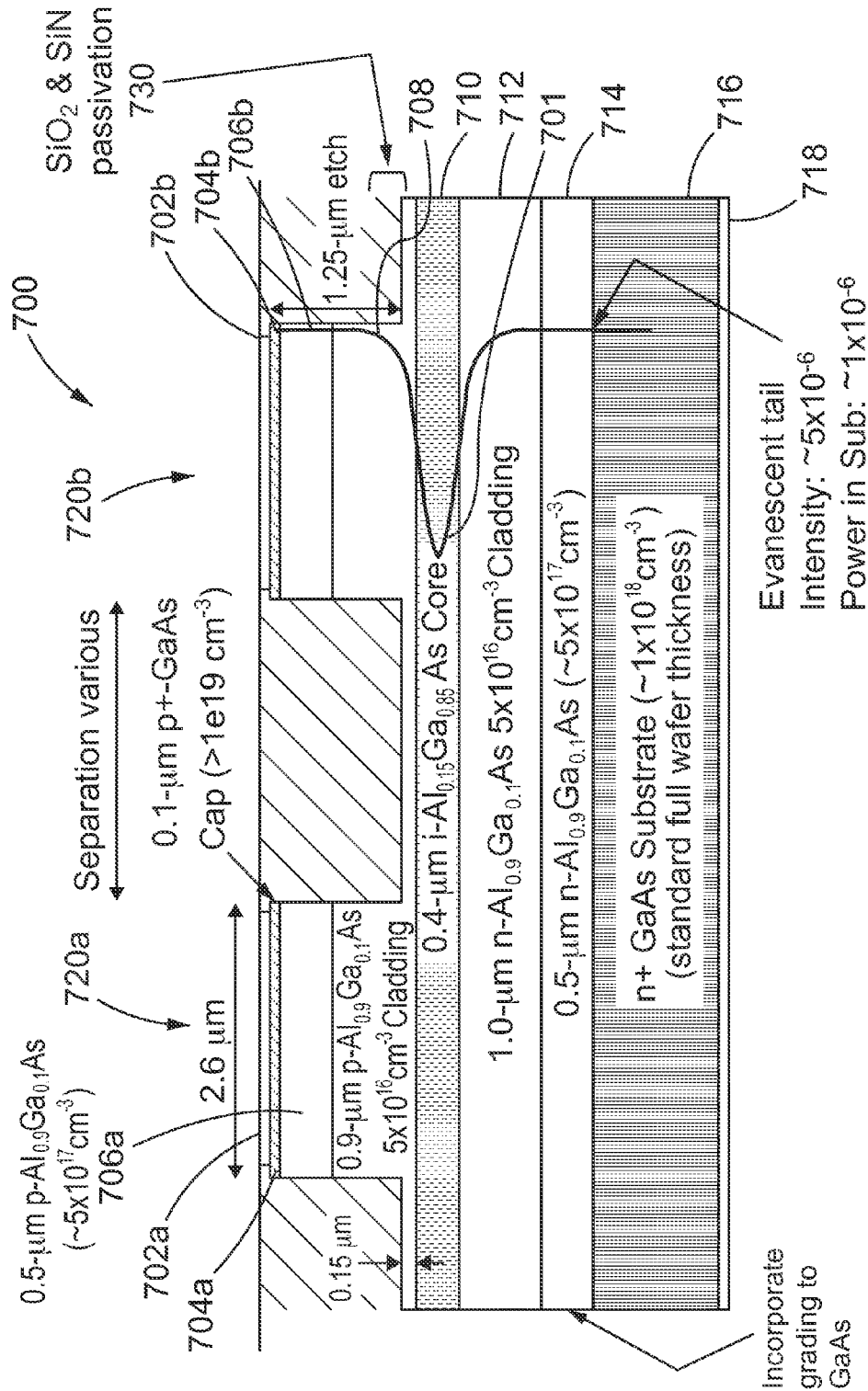
FIG. 7 shows the cross section of an inductance-tuned electro-optic modulator that includes a pair of ridge waveguides coupled together with a layer of conductive material.

FIG. 7 shows a cross section of a pair of parallel optical ridge waveguides in a Mach-Zehnder modulator 700. The waveguides include respective optical mesas 720a and 720b, each of which include respective Ohmic contacts or Schottky electrodes 702a/702b, GaAs cap layers 704a/704b, and heavily p-doped AlGaAs cladding layers 706a/706b. The heavily p-doped cladding layers 706a/706b are formed on top of a lightly p-doped AlGaAs upper cladding layer 708 that is patterned and coated with a SiO$_2$/SiN passivation layer 730. The waveguides also include an undoped AlGaAs core 710 between the upper cladding layer 708 and a lightly n-doped AlGaAs lower cladding layer 712, which is disposed on a more heavily n-doped AlGaAs cladding layer 714, a GaAs substrate 716, and a conductive (e.g., metallic) layer 718.

In operation, the refractive index mismatch between the core 710, the upper cladding layer 708, and the lower cladding layer 712 guides an optical wave with a mode distribution 701 with a peak in the core 710 and evanescent tails that extend into the cladding. Coupling an electric signal into the electrodes 702a and 702b produces an electric

TABLE 2

Layers in an Example Optical Ridge Waveguide

| Layer | Material | x Start | x Finish | Thickness (µm) | Dopant | Type | Conc. (cm$^{-3}$) | Notes |
|---|---|---|---|---|---|---|---|---|
| 9 | GaAs | | | 0.1 | Zinc | P | $>1 \times 10^{19}$ | Cap layer (ohmic contact & oxidation prevention) |
| 8 | Al(x)GaAs | 0.87 | 0.1 | 0.2 | Zinc | P | $5 \times 10^{17}$ | Composition grading from 87% to 10% AlGaAs; doping grading (Hall indicated $10^{17}$) |
| 7 | Al(x)GaAs | 0.87 | | 0.3 | Zinc | P | $5 \times 10^{17}$ | Additional cladding layer with higher doping (Hall measurement indicated $10^{17}$) |
| 6 | Al(x)GaAs | 0.87 | | 0.9 | Zinc | P | $5 \times 10^{16}$ | Upper cladding; last 0.1 µm graded in doping |
| 5 | Al(x)GaAs | 0.153 | | 0.4 | Undoped | I | $\leq 2 \times 10^{15}$ | Core. Undoped; Low aluminum content to keep refractive index and electro-optic effect high. Bandgap maintained above two-photon absorption limit for 1550 nm (1.6 eV). |
| 4 | Al(x)GaAs | 0.87 | | 1.0 | Silicon | N | $5 \times 10^{16}$ | Lower cladding; first 0.1 µm graded from doping in layer 3 to doping in layer 4 |
| 3 | Al(x)GaAs | 0.87 | | 0.3 | Silicon | N | $5 \times 10^{17}$ | Additional cladding layer with higher doping |
| 2 | Al(x)GaAs | 0.1 | 0.87 | 0.2 | Silicon | N | $5 \times 10^{17}$ | Composition grading from 10% to 87% AlGaAs, doping grading |
| 1 | GaAs | | | 0.2 | Silicon | N | $\sim 1\text{-}2 \times 10^{18}$ | Buffer layer |
| 0 | GaAs | | | | | n+ | | n+ GaAs substrate; standard thickness | field that is oriented from the electrodes 702*a* and 702*b* towards the bottom cladding layers 712 and 714 and the conductive layer 718. The electric field modulates the refractive indices of the electro-optic material(s) in the waveguides so as to advance or retard the phases of the optical waves propagating through the optical waveguides. In this case, the AlGaAs cladding layers and the AlGaAs core exhibit the electro-optic effect, so they will all respond to the electric field. In other cases, only the waveguide core or only the waveguide cladding may comprise electro-optic materials.

Optical Mode Conversion

Figure 8:
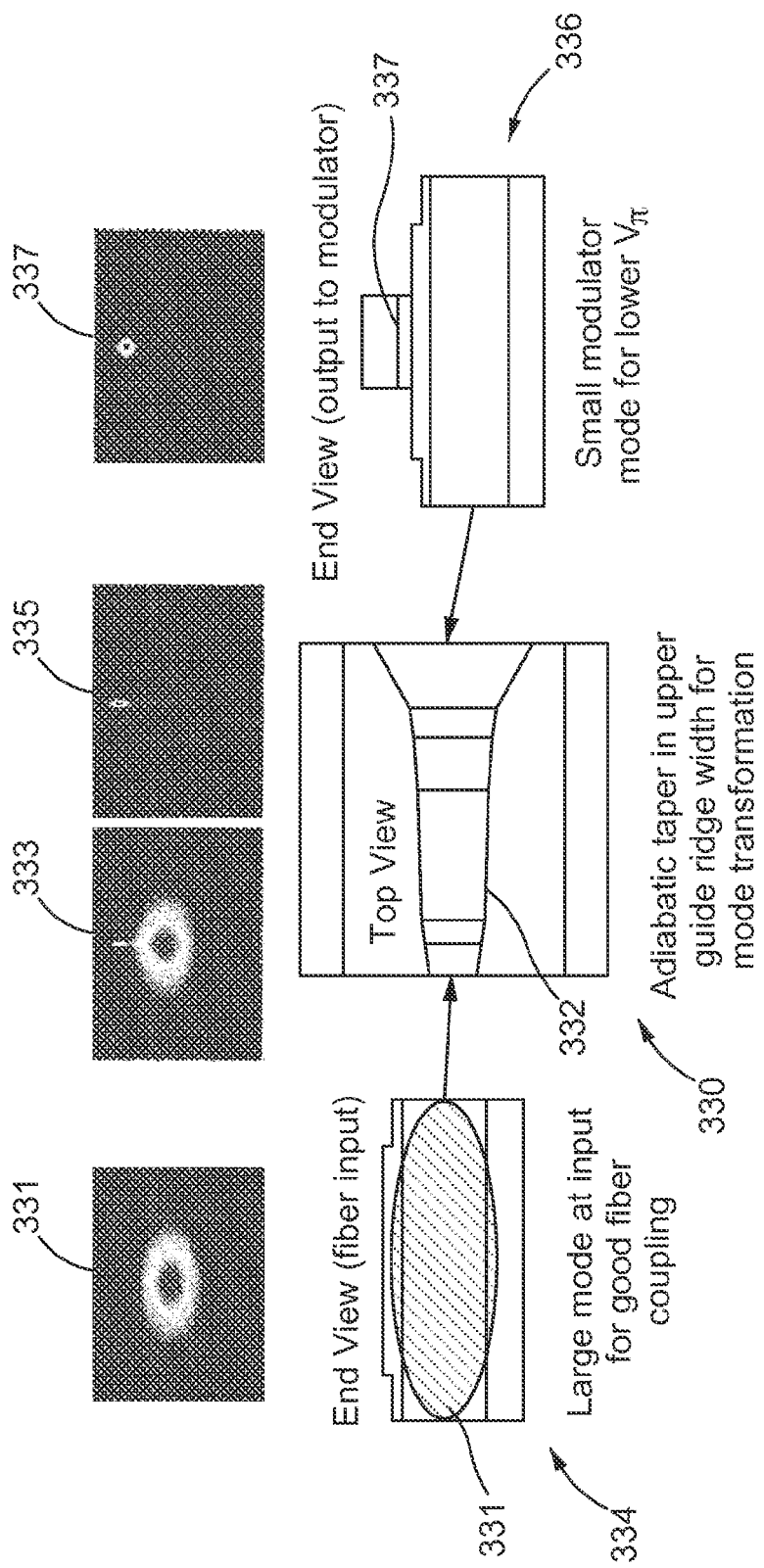
FIG. 8 shows an optical mode converter suitable for use in an inductance-tuned electro-optic modulator.

FIG. 8 illustrates the optical mode converter 330 of FIGS. 3A and 3B in greater detail. The optical mode converter 330 couples light into the optical ridge waveguide 320. More specifically, it converts a comparatively large mode 331 from the optical fiber 324 to the relatively small mode 337 supported by the optical ridge waveguide 320. It may operate with a coupling loss of about 0.5 dB or less, which suggests a total fiber-to-modulator-to-fiber loss of about 1 dB with fibers on both ends of the modulator 300. Light is initially coupled from the fiber 324 to a large, low-index waveguide 334 on the modulator chip. The light is then transferred from the large, low-index waveguide 334 to the higher index active waveguide 336 (which is on a higher plane) through an adiabatic taper 332. As the optical wave propagates through the adiabatic taper 332, the mode transitions through intermediate profiles 333 and 335 as the wave couples into the higher plane.

Modulator Fabrication

Simulations of traveling-wave photodiodes show that electric and magnetic fields propagating in doped semiconductor layers experience excess microwave loss and other anomalous propagation characteristics. To reduce these microwave losses, the bottom connections to the optical waveguides can be made of metal. The modulator may also include a bridge of metal or other conductive material that links the optical waveguides, e.g., as shown in FIGS. 3C and 3D.

Exemplary waveguides can be fabricated using standard semiconductor fabrication techniques, including metal-organic chemical vapor deposition. For example, an exemplary waveguide can be made by growing and etching optical-waveguide mesas on a starting substrate, connecting the tops of the mesas with a metal strip (e.g., with a supporting dielectric, such as Benzocyclobutene (BCB), between the mesas), removing the starting substrate, gluing the metal-strip side of the modulator to a high-resistivity carrier substrate, and depositing the coplanar-stripline electrodes on the resulting exposed waveguide-mesa cladding layers. To reduce microwave losses, the carrier wafers can be made of semi-insulating GaAs or quartz. The metal bridge between waveguide mesas may comprise a TiPtAu- or TiAu-coated Ag layer for lower loss; the TiPtAu or TiAu reduce or prevent oxidation or sulfurization of the Ag layer.

Simulated Electro-Optic Modulator Performance

Figure 9:
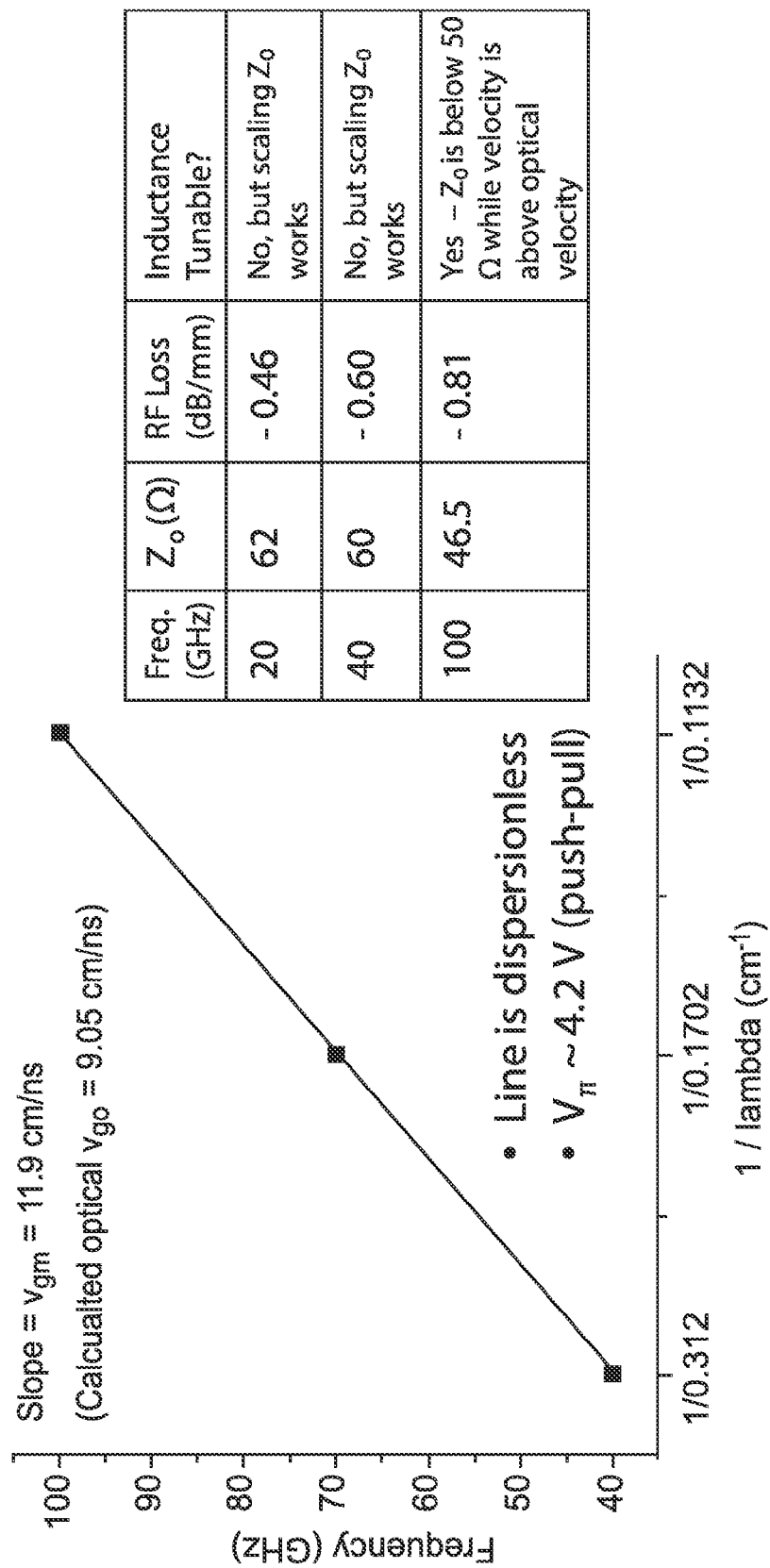
FIG. 9 is a plot of microwave frequency versus inverse wavelength for an electro-optic modulator before inductance tuning.

FIG. 9 shows an "$\omega$-$\beta$" plot (frequency vs. 1/wavelength) for a simulated Mach-Zehnder modulator (like the one shown in FIG. 3) with depleted AlGaAs layers (equiv. to $10^{14}$ cm$^{-3}$ background concentration) and a silver bottom layer that connects the bottoms of the two optical guides. The simulations, which were performed using the COMSOL Multiphysics package, yield an electrical group velocity (microwave velocity $v_{gm}$) of about 11.9 cm/ns. Note also that the $\omega$-$\beta$ response is a straight line over the simulated range of 40-100 GHz, which means that random, high-bandwidth signals can be handled by such a CPS modulator without significant envelope distortion (a major advantage). Other simulations down to 15 GHz show dispersionless behavior as well.

Separately, BeamPROP calculations show that the optical group velocity ($v_{go}$) down the 2.5-μm-wide optical guides is 9.05 cm/ns, which implies a velocity mismatch of 1.32 before tuning. At 100 GHz the line is inductance tunable, as $Z_0$ is below 50Ω while $v_{gm}$ is above $v_{go}$; $Z_0$ and $v_{gm}$ can be reduced by adjusting the line dimensions (capacitance) before the inductance tuning is performed. Inductance tuning may not work as easily at 20 and 40 GHz without redesigning more of the structure, but for these cases simply scaling the line dimensions to match the velocities still yields very nice input-reflection coefficient ($S_{11}$) matches to 50Ω. This is just an example model, but if desired this structure could be tuned based on the signal bandwidth of interest.

The simulations also show the well-known tradeoff between low $V_\pi$ and bandwidth, as an undoped-AlGaAs cladding (without layer-thickness adjustments) showed significantly higher estimated $V_\pi$ than the p-i-n test structure. A third example model was built to reduce $V_\pi$ in which only the optical ridge guides were doped (in the hope that the free-carrier loss would not be appreciable) and the lower undoped AlGaAs-cladding thickness was reduced to 0.8 μm. TABLE 3 summarizes the computed performance of the undoped and doped-ridge AlGaAs modulators, each of which can handle optical power levels of 100 mW or more:

TABLE 3

Computed Performance of Example AlGaAs Modulators

| Design | Freq. (GHz) | Velocity Match | Optical Fill Factor | Est. Intrinsic Optical Loss (dB/mm) | Est. RF Loss (dB/mm) | $V_\pi \cdot L$ (V-cm; push-pull, LEO only) | Final $Z_o$ (Ω) | Final $S_{11}$ Match (dB) | Max. Length for BW = Frequency Indicated (mm) | $V_\pi$ for Length and BW Indicated (V; push-pull) |
|---|---|---|---|---|---|---|---|---|---|---|
| All AlGaAs Undoped | 20 | Exact | 100% | <−0.09 | −0.46 | 4.2 | 47.0 | −30 | 14 | 3.0 |
| | 40 | Exact | 100% | <−0.09 | −0.60 | 4.2 | 45.4 | −26 | 10.6 | 4.0 |
| | 100 | Exact | 100% | <−0.09 | −0.92 | 4.2 | 50 | Perfect | 6.9 | 6.1 |
| Doped Ridges; 0.8-μm Clads | 20 | Exact | 100% | −0.09 | −0.59 | 2.3 | 51.8 | −35 | 10.7 | 2.1/1.5* |
| | 40 | Exact | 100% | −0.09 | −0.75 | 2.3 | 49.6 | −48 | 8.5 | 2.7/1.9* |
| | 100 | Exact | 100% | −0.09 | −1.2 | 2.3 | To be determined | | 5.3 | 4.3/3.0* |

*For cladding thicknesses reduced to 0.4 μm.

Figures 10A, 10B:
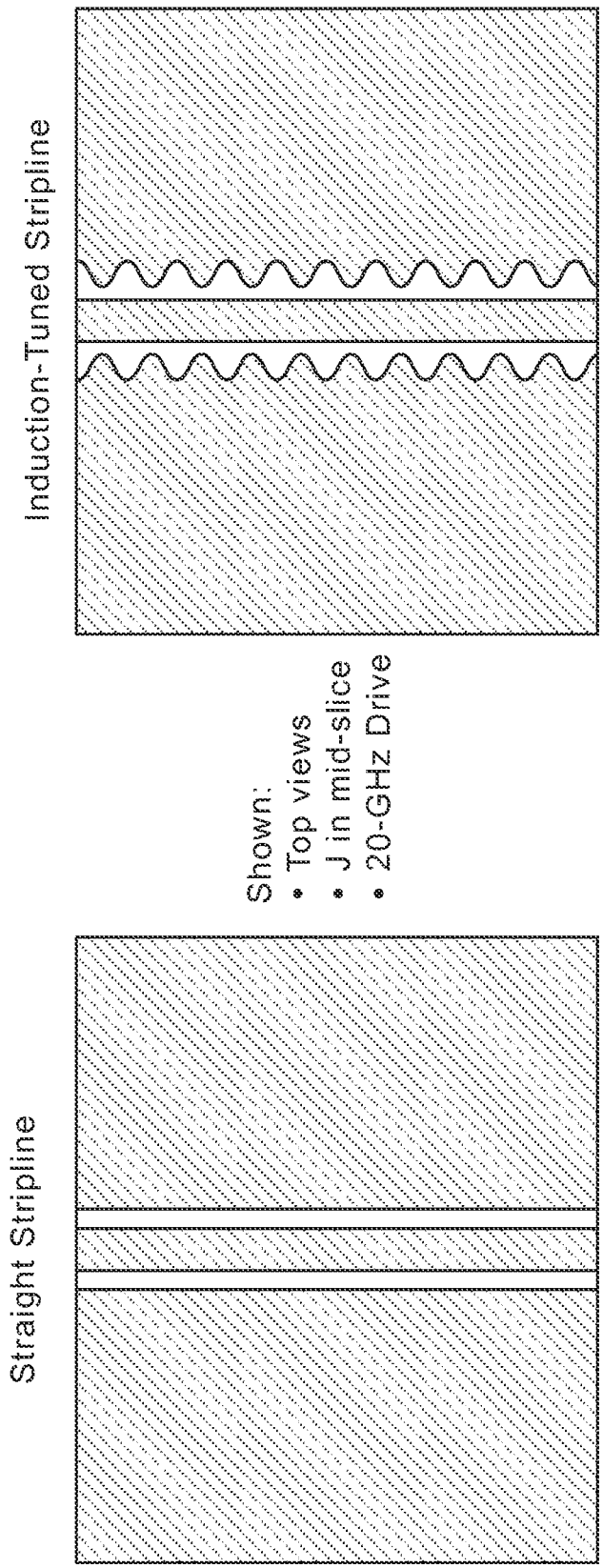
FIGS. 10A and 10B show simulated performance of an electro-optic modulator with straight striplines and of an inductance-tuned electro-optic modulator, respectively.

FIGS. 10A and 10B illustrate COMSOL simulations of the microwave loss expected for straight and inductively tuned striplines, respectively. They show top views of two representative coplanar-stripline models, showing the current density in a midplane that bisects the thickness of the lines. Note that the currents indeed travel mainly in the edges. The loss is measured in the middle of the lines so as not to be influenced by the slight field distortions at the input and output.

The striplines shown in FIGS. 10A and 10B were modeled on semi-insulating GaAs and no other lossy materials (except the Ag conductors) were present in the models. The bandwidths are well over 100 GHz, which goes against the conventional wisdom that metal electrodes cannot support an electrode bandwidth of 100 GHz or more. The sine-out design shown in FIG. 10B has straight inside edges, which enables the optical guides to be kept reasonably close together while maintaining a 100% Fill Factor, which in turn enables input/output couplers with the least S-bend curvature and lowest optical loss. TABLE 4 summarizes the microwave loss and modulator bandwidth for different stripline designs:

TABLE 4

Computed Microwave Loss vs. Frequency for Ag Coplanar Striplines

| Design | Electrode Microwave Loss (dB/mm) | | | Electrode E/O Bandwidth (for 1-cm modulator length) |
| --- | --- | --- | --- | --- |
| | 20 GHz | 60 GHz | 100 GHz | |
| Straight lines | 0.24 | 0.23 | 0.21 | ~160 GHz |
| Sine-out | 0.32 | 0.29 | 0.32 | ~140 GHz |
| Sine-in | 0.32 | 0.35 | 0.36 | ~130 GHz |

Notes:
(1) 7-µm sine amplitude for the sine-out and sine-in cases, average electrode width of 30 µm, and gap width of 20 µm.
(2) E/O bandwidth for a velocity-matched modulator is given by the −6.34-dB point for electrode microwave loss.
(3) Microwave losses from the semiconductor layers can be higher than the electrode loss.

Simulations also show that there may be advantages to implementing microwave photonic systems at 1.06 µm relative to 1.55 µm. Without being bound to any particular theory, it appears that (i) the decrease in modulator $V_\pi$ at 1.06 µm relative to 1.55 µm offsets the decrease in photodiode responsivity, resulting in increased radio-frequency (RF) gain, and (ii) the efficiency of lasers at 1.06 µm (e.g., 40-50%) is significantly larger than that at 1.55 µm (10-20%). The analysis suggests that the RF gain of a microwave photonic link using a GaAs-based modulator may be 2.3 dB larger at 1.06 µm than at 1.55 µm.

High Permeability Material for Inductance Tuning

Figure 11A:
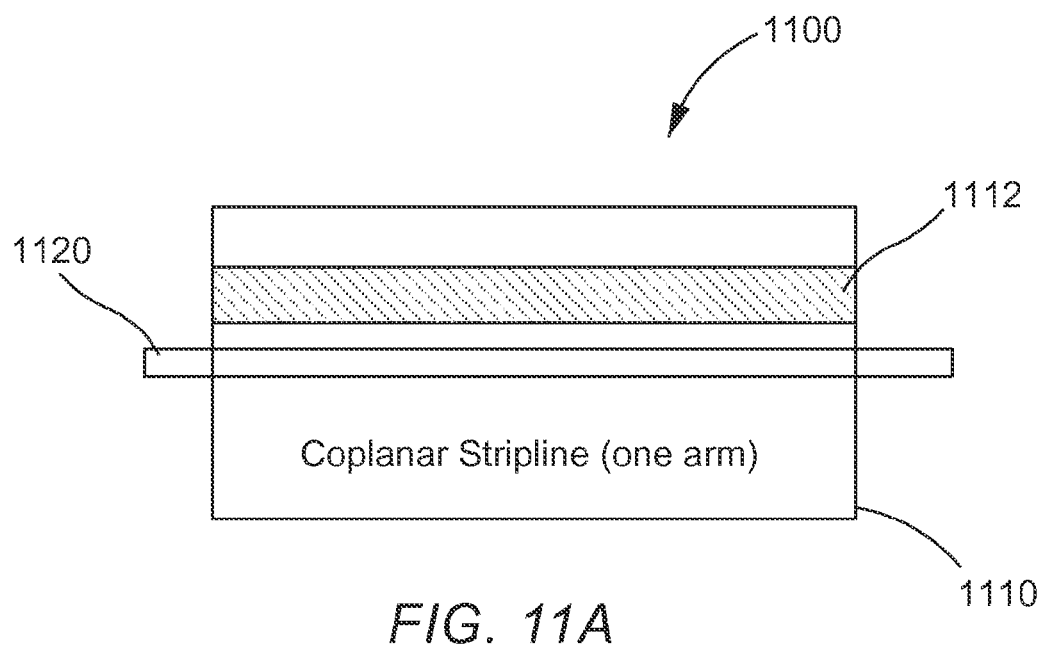
FIGS. 11A and 11B show electro-optic modulators that include high-permeability materials to increase inductance while negligibly affecting capacitance.
Figure 11B:
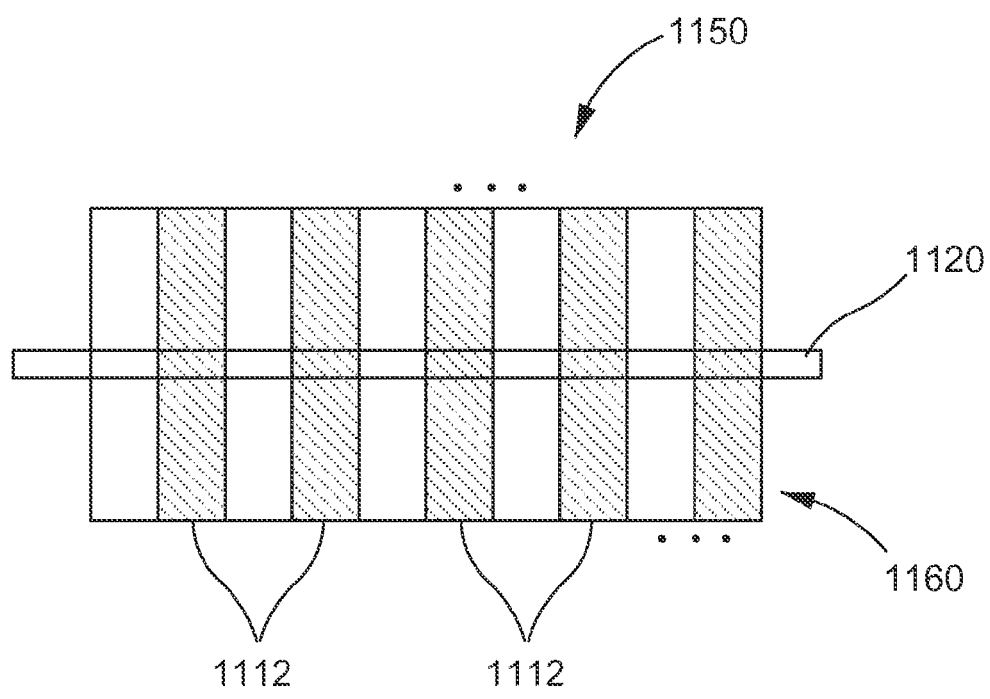

FIGS. 11A and 11B illustrate inductance tuning using high-permeability materials, including but not limited to ferrites, hexagonal ferrites, and strontium ferrites doped with aluminum. Incorporating high-permeability material in the microwave transmission line(s) raises the inductance while negligibly affecting the capacitance, thereby decoupling the tuning of inductance from the tuning of capacitance. The high-permeability material can be arranged in a variety of patterns to match the electrical group velocity to the optical group velocity and/or to set the impedance to a desired value, e.g., 50Ω. For example, FIG. 11A shows an inductance-tuned electro-optic modulator 1100 with a coplanar stripline 1110 that includes a strip of high-permeability material 1112 disposed parallel to an optical waveguide 1110. And FIG. 11B shows an inductance-tuned electro-optic modulator 1150 with a microwave transmission line 1160 that includes strips of high-permeability material 1112 arrayed periodically across the optical waveguide 1110. Keeping the periodicity of the high-permeability material in FIG. 11B below a quarter of a wavelength at the highest operating frequency may reduce Bragg-reflection effects.

Slow-Wave Meander Lines for Inductance Tuning

Figure 12A:
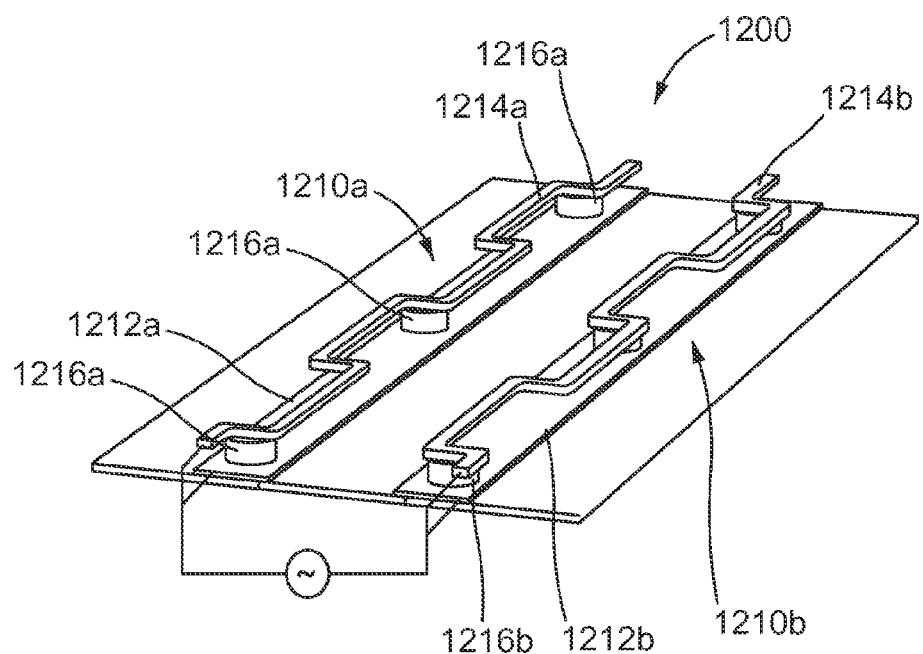
FIG. 12A shows an inductance-tuned electro-optic modulator with composite striplines that comprise slow-wave meander lines just above respective straight striplines.
Figure 12B:
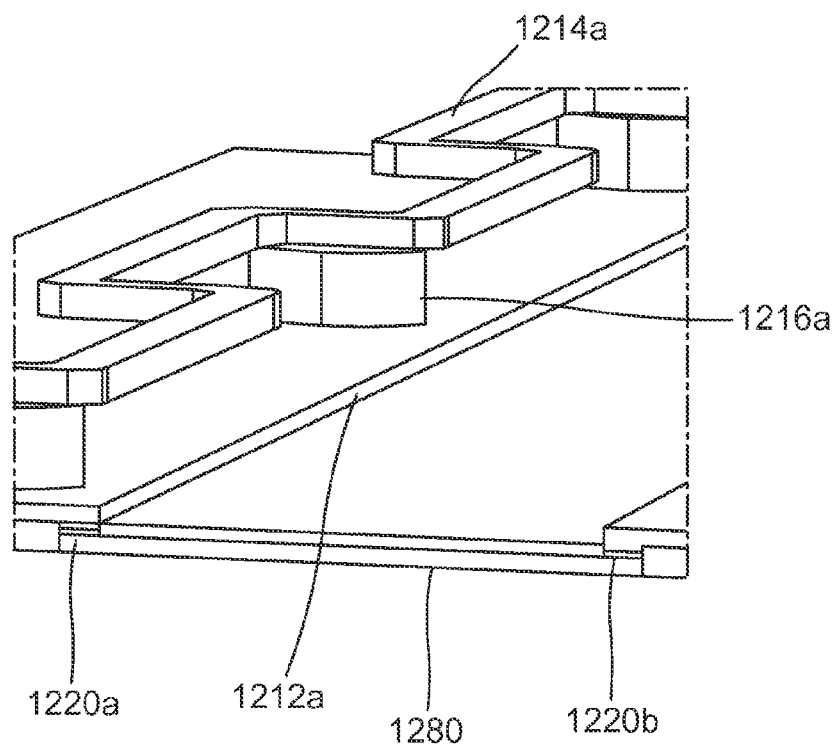
FIG. 12B is a close-up of the composite striplines of FIG. 12A showing silver connections between the slow-wave meander lines and the optical waveguide mesas.

FIGS. 12A and 12B show an inductance-tuned Mach-Zehnder electro-optic modulator 1200 with three-dimensional microwave transmission lines 1210a and 1210b (collectively, microwave transmission lines 1210). Each of these microwave transmission lines 1210 includes a slow-wave meander line 1214a/1214b supported in close proximity on top of a corresponding straight stripline conductor 1212a/1212b by posts 1216a/1216b. Each slow-wave meander line 1214a/1214b can be coupled to the corresponding stripline 1212a/1212b either periodically or continuously down their length using metal posts 1216a/1216b or ridges. The slow-wave meander lines 1214a/1214b can be separated from the striplines 1212a/1212b by a dielectric layer if desired. The transmission-line metallizations may comprise predominantly Ag to minimize skin losses. In order to prevent corrosion and environmental oxidation/sulfurization of the Ag, a very thin layer stack of Ti/Pt/Au or TiAu is deposited on top of the Ag layers.

Connecting the input of the slow-wave meander line 1214a/1214b to the input of the corresponding straight stripline conductor 1212a/1212b and driving them with a single current, as shown in FIG. 12A, results in a wave that travels down the combined line 1210a/1210b more slowly than it would along the simple stripline 1212a/1212b. Without being bound by any particular theory, the net traveling electromagnetic wave is a superposition of waves due to the currents and charges in the slow-wave meander lines 1214a/1214b and the striplines 1212a/1212b, and travels at a lower electrical group velocity. The exact shapes of the slow-meander lines 1214 can be selected to set a particular electrical group velocity (e.g., an electrical group velocity equal to the optical group velocity), to set a particular impedance (e.g., 50Ω), or both.

The modulator 1200 also includes optical waveguides 1220a and 1220b (collectively, optical waveguides 1220) that are disposed under the straight striplines 1212a and 1212b, respectively. A layer of conductive material 1280 (e.g., silver) is disposed under the optical waveguides 1220 opposite from the straight striplines 1212. This layer of conductive material 1280 orients the electric field such that electro-optic material in the optical waveguides 1220 experiences a very uniform electric field.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electro-optic modulator comprising:
   an optical waveguide, comprising an electro-optic material, to guide an optical wave propagating at an optical group velocity; and
   a microwave transmission line, in electrical communication with the optical waveguide, to guide an electrical signal propagating at an electrical group velocity so as to electro-optically modulate the optical wave guided by the optical waveguide, the microwave transmission line having at least one narrower segment and at least one wider segment that provide an inductance selected such that (i) the electrical group velocity is substantially equal to the optical group velocity and (ii) the microwave transmission line has an impedance of about 50Ω.

2. The electro-optic modulator of claim 1, wherein the optical waveguide comprises a cladding layer formed at least in part of the electro-optic material.

3. The electro-optic modulator of claim 1, wherein the optical waveguide comprises a core formed at least in part of the electro-optic material.

4. The electro-optic modulator of claim 1, wherein the optical waveguide comprises an optical mesa formed of at least one layer of the electro-optic material.

5. The electro-optic modulator of claim 1, wherein the optical waveguide comprises an optical mesa disposed over at least one layer of the electro-optic material.

6. The electro-optic modulator of claim 1, wherein:
   the optical waveguide comprises a first waveguide to guide a first portion of the optical wave and a second waveguide to guide a second portion of the optical wave; and
   the microwave transmission line comprises a first microwave transmission line, disposed in electrical communication with the first waveguide, to modulate a phase of the first portion of the optical wave and a second microwave transmission line, disposed in electrical communication with the second waveguide, to modulate a phase of the second portion of the optical wave.

7. The electro-optic modulator of claim 6, further comprising:
   a conductive layer, disposed opposite the electro-optic material from the first microwave transmission line and the second microwave transmission line, to orient an electric field associated with the electrical signal across the electro-optic material.

8. The electro-optic modulator of claim 1, wherein the microwave transmission line comprises a layer of conductive material having at least one undulating edge, the at least one undulating edge at least partially defining the at least one narrower segment and the at least one wider segment.

9. The electro-optic modulator of claim 8, wherein the at least one narrower segment and the at least one wider segment completely overlap the optical waveguide.

10. The electro-optic modulator of claim 1, wherein the microwave transmission line comprises a layer of conductive material having at least one edge in the shape of at least one of a square wave, a rounded square wave, a sawtooth wave, a rounded sawtooth wave, a sinusoid, a sine-like wave, or a Bézier curve, the at least one edge at least partially defining the at least one narrower segment and the at least one wider segment.

11. An electro-optic modulator comprising:
    an optical waveguide, comprising an electro-optic material, to guide an optical wave propagating at an optical group velocity; and
    a microwave transmission line, in electrical communication with the optical waveguide, to guide an electrical signal propagating at an electrical group velocity so as to electro-optically modulate the optical wave guided by the optical waveguide, the microwave transmission line having an inductance selected such that (i) the electrical group velocity is substantially equal to the optical group velocity and (ii) the microwave transmission line has an impedance of about 50Ω,
    wherein the microwave transmission line comprises a first material having a first permeability and a second material having a second permeability greater than the first permeability.

12. An electro-optic modulator comprising:
an optical waveguide, comprising an electro-optic material, to guide an optical wave propagating at an optical group velocity; and
a microwave transmission line, in electrical communication with the optical waveguide, to guide an electrical signal propagating at an electrical group velocity so as to electro-optically modulate the optical wave guided by the optical waveguide, the microwave transmission line an inductance selected such that (i) the electrical group velocity is substantially equal to the optical group velocity and (ii) the microwave transmission line has an impedance of about 50Ω, the microwave transmission line comprising:
a conductive strip, disposed over the optical waveguide, to conduct the electrical signal at a first velocity; and
a meander line, supported above the conductive strip, to conduct the electrical signal at a second velocity lower than the first velocity.

13. The electro-optic modulator of claim 1, wherein the microwave transmission line has a loss about equal to or less than 0.7 dB/mm at a frequency of about 100 GHz.

14. The electro-optic modulator of claim 1, wherein the optical waveguide comprises:
a mode conversion region, in optical communication with another optical waveguide, to convert a first optical mode guided by the other waveguide into a second optical mode guided by the optical waveguide.

15. The electro-optic modulator of claim 1, wherein the optical waveguide comprises:
at least one quantum well, defined in the optical waveguide, to increase a modulation efficiency of the electro-optic modulator.

16. A method of modulating an optical wave with an electro-optic modulator comprising an optical waveguide and a microwave transmission line in electrical communication with the optical waveguide and having at least one narrower segment and at least one wider segment that provide an inductance selected such that (i) an electrical group velocity of an electrical signal propagating via the microwave transmission line is approximately equal to an optical group velocity of the optical wave propagating via the optical waveguide and (ii) the microwave transmission line has an impedance of about 50Ω, the method comprising:
(A) coupling the optical wave into at least one optical waveguide so as to cause the optical wave to propagate via the optical waveguide at an optical group velocity; and
(B) applying an electrical signal to the at least one narrower segment and the at least one wider segment of the microwave transmission line so as to electro-optically modulate the optical wave guided by the optical waveguide.

17. The method of claim 16, wherein (A) comprises coupling the optical wave into a ridge waveguide comprising an optical mesa formed of at least one layer of electro-optic material.

18. The method of claim 16, wherein (A) comprises coupling the optical wave into a ridge waveguide comprising an optical mesa disposed over at least one layer of electro-optic material.

19. The method of claim 16, wherein (A) comprises:
coupling the optical wave into the optical waveguide from another optical waveguide; and
converting a first optical mode guided by the other waveguide into a second optical mode guided by the optical waveguide.

20. The method of claim 16, wherein (A) comprises:
guiding the optical wave through a region of the optical waveguide comprising at least one quantum well.

21. The method of claim 16, wherein:
(A) comprises coupling a first portion of the optical wave into a first waveguide and coupling a second portion of the optical wave into a second waveguide, and
(B) comprises applying a first electrical signal to a first microwave transmission line in electrical communication with the first waveguide so as to modulate a phase of the first portion of the optical wave and applying a second electrical signal to a second microwave transmission line in electrical communication with the second waveguide so as to modulate a phase of the second portion of the optical wave.

22. The method of claim 16, wherein (B) comprises guiding the electrical signal via a layer of conductive material having at least one undulating edge, the at least one undulating edge at least partially defining the at least one narrower segment and the at least one wider segment.

23. The method of claim 22, wherein the at least one narrower segment and the at least one wider segment completely overlap the optical waveguide.

24. The method of claim 16, wherein (B) comprises guiding the electrical signal via the microwave transmission line at a loss about equal to or less than 0.7 dB/mm at a frequency of about 100 GHz.

25. An electro-optic modulator comprising:
a Mach-Zehnder interferometer comprising an electro-optic material;
a first strip of conductive material disposed in a first plane parallel to the Mach-Zehnder interferometer, having at least one undulating edge to provide an impedance of about 50Ω, and completely overlapping a first arm of the Mach-Zehnder interferometer, the at least one undulating edge undulating in the first plane; and
a second strip of conductive material disposed in the first plane, having at least one undulating edge to provide an impedance of about 50Ω, and completely overlapping a second arm of the Mach-Zehnder interferometer, the at least one undulating edge undulating in the first plane.

26. The electro-optic modulator of claim 25, further comprising:
a third strip of conductive material, disposed in the first plane, parallel to the first strip and the second strip.

27. The electro-optic modulator of claim 25, further comprising:
a layer of conductive material disposed in a second plane parallel to the first plane and opposite the Mach-Zehnder interferometer.

28. The electro-optic modulator of claim 25, wherein:
the Mach-Zehnder interferometer guides light at a first velocity; and
the first strip and the second strip guide a microwave signal at a second velocity substantially equal to the first velocity.

* * * * *